(12) United States Patent
Inagaki et al.

(10) Patent No.: US 10,096,828 B2
(45) Date of Patent: Oct. 9, 2018

(54) ACTIVE MATERIAL, NONAQUEOUS ELECTROLYTE BATTERY, BATTERY MODULE, BATTERY PACK, AUTOMOBILE AND VEHICLE

(71) Applicant: Kabushiki Kaisha Toshiba, Minato-ku (JP)

(72) Inventors: Hiroki Inagaki, Yokohama (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 153 days.

(21) Appl. No.: 15/246,613

(22) Filed: Aug. 25, 2016

(65) Prior Publication Data

US 2017/0062817 A1    Mar. 2, 2017

(30) Foreign Application Priority Data

Aug. 25, 2015 (JP) .................................. 2015-165947

(51) Int. Cl.
  *H01M 2/00*   (2006.01)
  *H01M 4/485*  (2010.01)
  (Continued)

(52) U.S. Cl.
  CPC ......... *H01M 4/485* (2013.01); *H01M 2/1077* (2013.01); *H01M 4/131* (2013.01);
  (Continued)

(58) Field of Classification Search
  CPC ...... H01M 4/131; H01M 4/362; H01M 4/485; H01M 2/1077
  See application file for complete search history.

(56) References Cited

U.S. PATENT DOCUMENTS

2004/0131941 A1   7/2004   Belharouak et al.
2008/0318127 A1  12/2008   Belharouak et al.
(Continued)

FOREIGN PATENT DOCUMENTS

CN   102842742 (A)   12/2012
CN   103811738 A      5/2014
(Continued)

OTHER PUBLICATIONS

Extended European Search Report dated Nov. 29, 2016 in Patent Application No. 16185279.3.
(Continued)

*Primary Examiner* — Cynthia H Kelly
*Assistant Examiner* — Monique M Wills
(74) *Attorney, Agent, or Firm* — Oblon, McClelland, Maier & Neustadt, L.L.P.

(57) ABSTRACT

According to one embodiment, there is provided an active material. The active material includes a titanium-containing oxide. The titanium-containing oxide is represented by a general formula of $Li_{(2+w)}Na_{(2-x)}M1_{(x/2)}Ti_{(6-y)}M2_zO_{14}$. In the general formula, the subscripts w, x, y and z are within ranges of $0 \leq w \leq 6$, $0 < x < 2$, $0 \leq y \leq 3$, and $0 \leq z \leq 3$, respectively. M1 is at least one metallic element selected from the group consisting of Sr, Ba, and Pb. M2 is at least one element selected from the group consisting of metallic elements M (excluding Ti and M1) and P.

14 Claims, 5 Drawing Sheets

(51) Int. Cl.
　　　*H01M 4/131*　　　(2010.01)
　　　*H01M 4/36*　　　(2006.01)
　　　*H01M 2/10*　　　(2006.01)
　　　*H01M 4/505*　　　(2010.01)
　　　*H01M 4/58*　　　(2010.01)
　　　*H01M 10/0525*　　　(2010.01)
(52) U.S. Cl.
　　　CPC .......... *H01M 4/362* (2013.01); *H01M 4/366* (2013.01); *H01M 4/505* (2013.01); *H01M 4/5825* (2013.01); *H01M 10/0525* (2013.01); *H01M 2220/20* (2013.01)

(56) References Cited

U.S. PATENT DOCUMENTS

| 2011/0151330 | A1 | 6/2011 | Belharouak et al. |
| 2011/0293507 | A1 | 12/2011 | Dambournet et al. |
| 2012/0328930 | A1 | 12/2012 | Inagaki et al. |
| 2014/0011100 | A1* | 1/2014 | Lee .................. H01M 8/1016 429/403 |
| 2016/0226067 | A1 | 8/2016 | Harada et al. |

FOREIGN PATENT DOCUMENTS

| EP | 3 051 612 A1 | 8/2016 |
| JP | 2001-143702 | 5/2001 |
| JP | 4237659 | 3/2009 |
| JP | 2013-8493 | 1/2013 |
| WO | WO 2016/084200 A1 | 6/2016 |

OTHER PUBLICATIONS

I. Koseva, et al., "A New Strontium Lithium Titanium Oxide, $SrLi_2Ti_6O_{14}$: Crystal Growth and Structure Determination", Zeitschnft fur Naturforschungn—Section B Journal of Chemical Sciences, vol. 57, XP-002760853, 2002, pp. 512-518.

R. Dominko et al. "Alkali hexatitanates—$A_2Ti_6O_{13}$ (A-Na,K) as host structure for reversible lithium insertion", Journal of Power Sources 174, 2007, 5 pages.

* cited by examiner

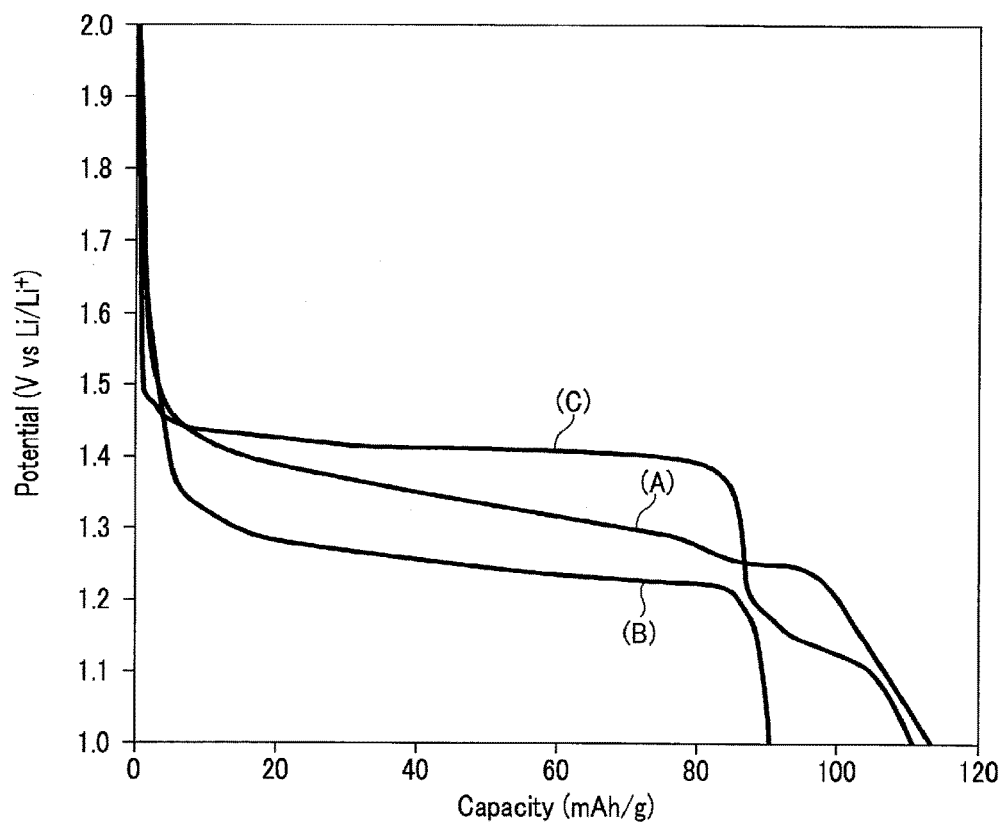
F I G. 1

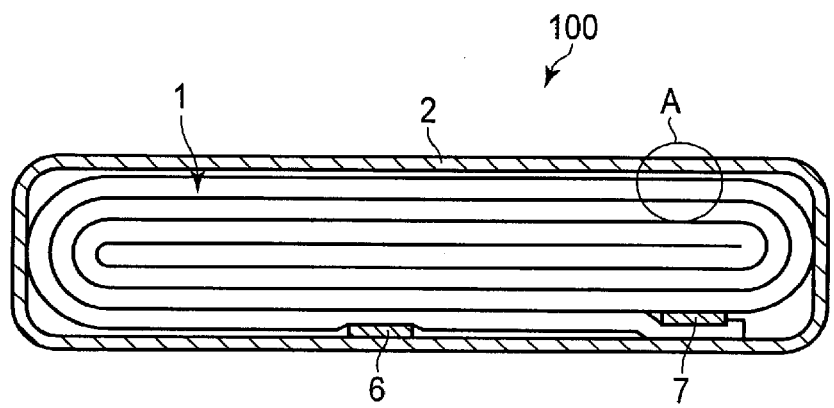
F I G. 2
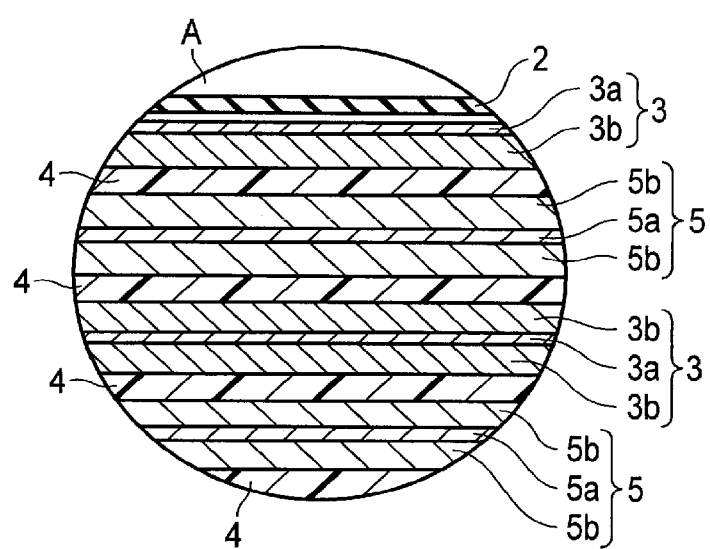
F I G. 3

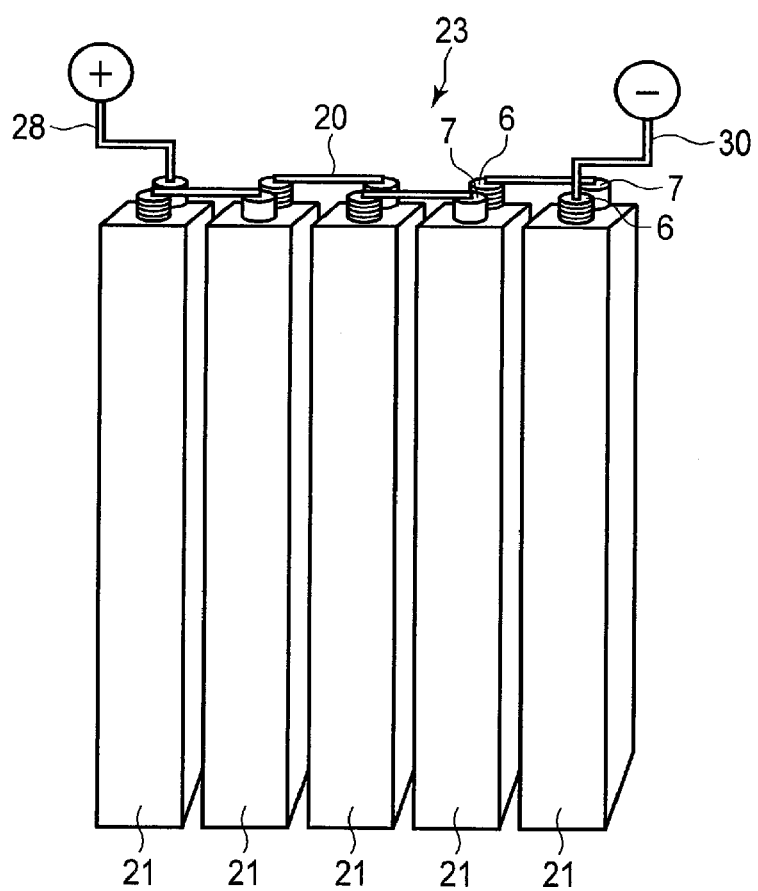
F I G. 4

ACTIVE MATERIAL, NONAQUEOUS ELECTROLYTE BATTERY, BATTERY MODULE, BATTERY PACK, AUTOMOBILE AND VEHICLE

CROSS-REFERENCE TO RELATED APPLICATIONS

This application is based upon and claims the benefit of priority from the Japanese Patent Application No. 2015-165947, filed Aug. 25, 2015, the entire contents of which are incorporated herein by reference.

FIELD

Embodiments described herein relate generally to an active material for a battery, a nonaqueous electrolyte battery, a battery module, a battery pack, an automobile, and a vehicle.

BACKGROUND

In recent years, by rapid technical-development in electronics field, downsizing and lightening of electronic apparatuses progress. As the result, electronic apparatuses are becoming more and more portable and cordless, and downsizing, lightening and improvement in energy density of secondary power sources as driving sources of electronic apparatuses are strongly desired. In order to respond to such demands, lithium secondary batteries which can exhibit a high energy density have been developed. Lately, ultrathin and lightweight secondary batteries using a laminate film including aluminum as container members have also been developed and commercialized.

However, the thickness of such a secondary battery using the laminate film including aluminum changes due to volume expansion and shrinkage of electrodes when charge and discharge. The change in thickness causes a twisted battery, or making a distance between electrodes larger, leading to larger resistances of the battery, and finally reduced performance of battery.

In order to solve such a problem, batteries using lithium titanate as a negative electrode active material have been proposed. Lithium titanate exhibits almost no volumetric change associated with charge and discharge, and extremely small changes in the thickness of the battery. Thus, by using lithium titanate as a negative electrode active material, the above described problem can be solved.

In the lithium titanate, the inserting-and-extracting reaction of lithium progresses at approximately 1.55 V (vs. Li/Li$^+$). The battery using the lithium titanate in the negative electrode and, for example, LiMn$_2$O$_4$ in a positive electrode exhibits approximately 2.5 V of a battery voltage. This voltage is much lower than 3.9 V, which is the battery voltage of widely commercialized lithium-ion secondary batteries including carbon negative electrode and LiMn$_2$O$_4$ positive electrode. That is, an increase in series-connecting number (number of batteries) is needed for a battery module or a battery pack including nonaqueous electrolyte batteries containing lithium titanate in order to realize the same voltage as that of a battery module or a battery pack including the carbon negative electrode and the LiMn$_2$O$_4$ positive electrode.

BRIEF DESCRIPTION OF THE DRAWINGS

FIG. 1 shows charging curves of three kinds of titanium-containing oxides;

FIG. 2 is a schematic sectional view showing an example of a nonaqueous electrolyte battery according to a second embodiment;

FIG. 3 is an enlarged sectional view of part A of a nonaqueous electrolyte battery shown in FIG. 2;

FIG. 4 is a schematic perspective view showing an example of a battery module according to a third embodiment;

DETAILED DESCRIPTION

Figure 5:
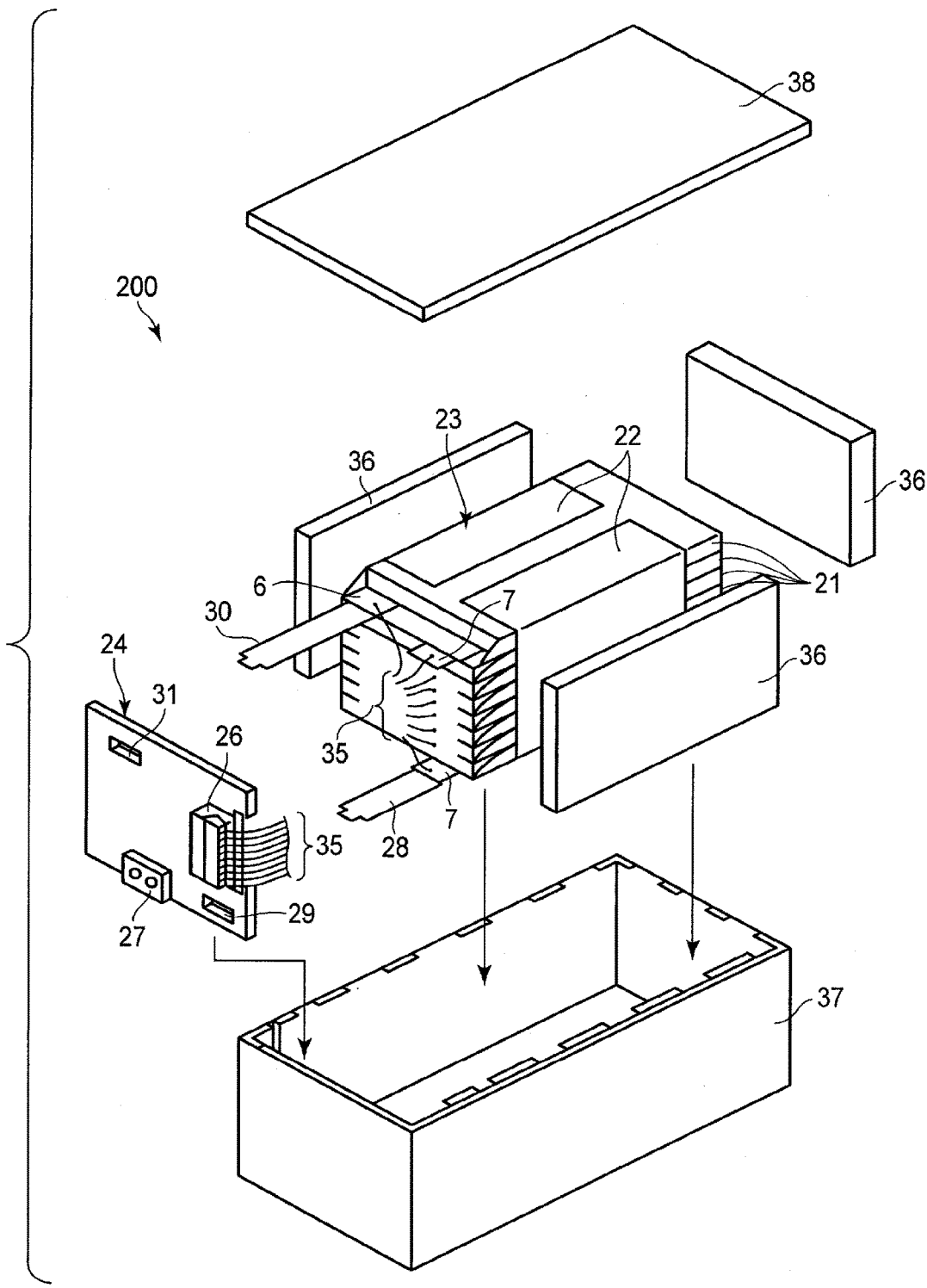
FIG. 5 is an exploded perspective view showing an example of a battery pack according to a fourth embodiment.

In general, according to one embodiment, there is provided an active material. The active material includes a titanium-containing oxide. The titanium-containing oxide is represented by a general formula of Li$_{(2+w)}$Na$_{(2-x)}$M1$_{(x/2)}$Ti$_{(6-y)}$M2$_z$O$_{14}$. In the general formula, the subscripts w, x, y and z are within ranges of $0 \le w \le 6$, $0 < x < 2$, $0 \le y \le 3$, and $0 \le z \le 3$, respectively. M1 is at least one metallic element selected from the group consisting of Sr, Ba, and Pb. M2 is at least one element selected from the group consisting of metallic elements M (excluding Ti and M1) and P.

The embodiments will be explained below with reference to the drawings. In this case, the structures common to all embodiments are represented by the same symbols and duplicated explanations will be omitted. Also, each drawing is a typical view for explaining the embodiments and for promoting an understanding of the embodiments. Though there are parts different from an actual device in shape, dimension and ratio, these structural designs may be properly changed taking the following explanations and known technologies into consideration.

(First Embodiment)

According to a first embodiment, there is provided an active material for a battery. The active material includes a titanium-containing oxide. The titanium-containing oxide is represented by a general formula of Li$_{(2+w)}$Na$_{(2-x)}$M1$_{(x/2)}$Ti$_{(6-y)}$M2$_z$O$_{14}$. In the general formula, the subscripts w, x, y and z are within ranges of $0 \le w \le 6$, $0 < x < 2$, $0 \le y \le 3$, and $0 \le z \le 3$, respectively. M1 is at least one metallic element selected from the group consisting of Sr, Ba, and Pb. M2 is at least one element selected from the group consisting of metallic elements M (excluding Ti and M1) and P. M1 may be one metallic element selected from the group consisting of Sr, Ba, and Pb, or may be two or more elements selected from the group consisting of Sr, Ba, and Pb. M2 may be one element selected from the group consisting of metallic elements M (excluding Ti and M1) and P, or may be two or more elements selected from the group consisting of metallic elements M (excluding Ti and M1) and P.

In the battery active material according to the first embodiment, inserting-and-extracting reaction of lithium can progress at a lower potential than that of lithium titanate. Moreover, the battery active material according to the first embodiment can exhibit a gentle potential change over a wide state-of-charge (SOC) range equivalent to that of lithium titanate. Furthermore, the battery active material according to the first embodiment can realize an excellent life property. As a result, the battery active material according to the first embodiment can realize a nonaqueous electrolyte battery that can exhibit excellent input-output characteristics and high voltage. The reasons therefor will be explained below.

In FIG. 1, charging curves of three kinds of titanium-containing oxides are shown. In the charging curves shown in FIG. 1, the direction of lithium-extraction is set as the charging direction. The titanium-containing oxides whose charging curves are shown in FIG. 1 are titanium-containing oxide (A) of $Li_2NaSr_{0.5}Ti_6O_{14}$, titanium-containing oxide (B) of $Li_2Na_2Ti_6O_{14}$, and titanium-containing oxide (C) of $Li_2SrTi_6O_{14}$. Titanium-containing oxide (A) is an oxide that can be represented by a general formula of $Li_{(2+w)}Na_{(2-x)}M1_{(x/2)}Ti_{(6-y)}M2_zO_{14}$ (0<x<2, M1 is at least one metallic element selected from the group consisting of Sr, Ba, and Pb), while titanium-containing oxides (B) and (C) are oxides that cannot be represented by a general formula of $Li_{(2+w)}Na_{(2-x)}M1_{(x/2)}Ti_{(6-y)}M2_zO_{14}$ where x is within a range of 0<x<2.

As shown in FIG. 1, titanium-containing oxide (C) of $Li_2SrTi_6O_{14}$ shows a charging curve with steps of potential. The discharge curve of titanium-containing oxide (C) of $Li_2SrTi_6O_{14}$ also has steps of potential. Therefore, it is difficult to obtain stable output over a wide SOC range using titanium-containing oxide (C) of $Li_2SrTi_6O_{14}$. In contrast, as shown in FIG. 1, titanium-containing oxide (B), $Li_2Na_2Ti_6O_{14}$, shows a charging curve without steps of potential but with a continuous and gentle potential change over a wide SOC range. Titanium-containing oxide (B) of $Li_2Na_2Ti_6O_{14}$ also shows a discharging curve with continuous and gentle potential change over a wide SOC range. Accordingly, stable output over a wide SOC range can be obtained by titanium-containing oxide (B) of $Li_2Na_2Ti_6O_{14}$. However, as shown in FIG. 1, a capacity of titanium-containing oxide (B) of $Li_2Na_2Ti_6O_{14}$, is smaller than that of titanium-containing oxide (C) of $Li_2SrTi_6O_{14}$.

While, as shown in FIG. 1, titanium-containing oxide (A) of $Li_2NaSr_{0.5}Ti_6O_{14}$ can show a charging curve with continuous and gentle potential change over wide a SOC range, similar to that of titanium-containing oxide (B) of $Li_2Na_2Ti_6O_{14}$. In a discharge curve of titanium-containing oxide (A) of $Li_2NaSr_{0.5}Ti_6O_{14}$, a potential also continuously and gently changes over wide a SOC range. Moreover, as shown in FIG. 1, capacity of titanium-containing oxide (A) of $Li_2NaSr_{0.5}Ti_6O_{14}$ is near to that of titanium-containing oxide (C) of $Li_2SrTi_6O_{14}$. Accordingly, titanium-containing oxide (A) of $Li_2NaSr_{0.5}Ti_6O_{14}$ can exhibit stable input and output over a wide SOC range together with large capacity.

Furthermore, not shown in FIG. 1, but titanium-containing oxide (A) of $Li_2NaSr_{0.5}Ti_6O_{14}$ has more excellent cycle life than those of titanium-containing oxide (B) of $Li_2Na_2Ti_6O_{14}$, and titanium-containing oxide (C) of $Li_2SrTi_6O_{14}$, which will be demonstrated in Examples of the present specification.

In addition, as shown in FIG. 1, in titanium-containing oxide (A) of $Li_2NaSr_{0.5}Ti_6O_{14}$, an inserting reaction of lithium can progress at lower potential than 1.5 V (vs. $Li/Li^+$). Although not shown in FIG. 1, but in titanium-containing oxide (A) of $Li_2NaSr_{0.5}Ti_6O_{14}$, an extracting reaction of lithium can progress at lower potential than 1.5 V (vs. $Li/Li^+$). That is, in titanium-containing oxide (A), $Li_2NaSr_{0.5}Ti_6O_{14}$, inserting and extracting reactions of lithium can progress at a lower potential than that of lithium titanate.

Because of these, titanium-containing oxide (A) of $Li_2NaSr_{0.5}Ti_6O_{14}$ can realize a nonaqueous electrolyte battery that can exhibit excellent input-output characteristics and a high voltage.

In the general formula of $Li_{(2+w)}Na_{(2-x)}M1_{(x/2)}Ti_{(6-y)}M2_zO_{14}$, the subscript w changes within a range of 0≤w≤6, according to the charged/discharged state of a titanium-containing oxide represented by this general formula.

The subscript x shows the ratio of sites substituted by at least one metallic element M1 selected from the group consisting of Sr, Ba, and Pb, among Na sites in a titanium-containing composite oxide represented by a general formula of $Li_{(2+w)}Na_2Ti_{(6-y)}M2_zO_{14}$.

The subscript y refers to the ratio of sites substituted by at least one element M2 selected from the group consisting of metallic elements M (excluding Ti and M1) and P, among Ti sites in a titanium-containing composite oxide represented by a general formula, $Li_{(2+w)}Na_{(2-x)}M1_{(x/2)}Ti_6O_{14}$. The subscript z shows the amount of the element M2 contained in 1 mol of the titanium-containing composite oxide represented by the general formula described above. M2 may be an element having a different valence from that of Ti, and the subscript y and the subscript z may be different from each other. Alternatively, if the element M2 has the same valence as that of Ti, the value of the subscript y may be the same as that of the subscript z. Values of the subscript y and the subscript z, and the element M2 may be combinationally selected so that the titanium-containing oxide represented by the general formula of $Li_{(2+w)}Na_{(2-x)}M1_{(x/2)}Ti_{(6-y)}M2_zO_{14}$ is electrically neutral.

The titanium-containing oxide represented by the general formula of $Li_{(2+w)}Na_{(2-x)}M1_{(x/2)}Ti_{(6-y)}M2_zO_{14}$, wherein the subscript w is within a range of 0≤w≤6, the subscript x is within a range of 0<x<2, the subscript y is within a range of 0≤y≤3, the subscript z is within a range of 0≤z≤3, and M1 is at least one metallic element selected from the group consisting of Sr, Ba, and Pb, M2 is at least one element selected from the group consisting of metallic elements M (excluding Ti and M1) and P, in the same way as titanium-containing oxide (A) of $Li_2NaSr_{0.5}Ti_6O_{14}$, whose charging curve is shown in FIG. 1, can exhibit stable high input and high output over a wide SOC range together with large capacity, can exhibit an excellent cycle life, and in such a titanium-containing oxide, inserting and extracting reactions of lithium can progress at a lower potential than that of lithium titanate, which will be demonstrated in the Examples of the present specification.

Based on the reasons described above, the battery active material according to the first embodiment including the titanium-containing oxide represented by the general formula of $Li_{(2+w)}Na_{(2-x)}M1_{(x/2)}Ti_{(6-y)}M2_zO_{14}$ can realize a nonaqueous electrolyte battery that can exhibit excellent input-output characteristics, excellent life property, and a high voltage.

From the viewpoint of energy density, the metallic element M1 is preferably at least one metallic element of Sr and Ba, and is more preferably Sr. Since the metallic element M1 is a divalent metal, x mol of Na in a titanium-containing composite oxide represented by the general formula of $Li_{(2+w)}Na_2Ti_{(6-y)}M2_zO_{14}$ can be substituted by x/2 mol of the metallic element M1. The value of the subscript x is preferably within a range of 0.1≤x≤1.9. When the subscript x is within this range, both of higher capacity and more excellent life property can be obtained. A more preferable range of the subscript x is 0.25≤x≤1.8.

By substituting a part of Ti sites in a titanium-containing oxide represented by the general formula of $Li_{(2+w)}Na_{(2-x)}M1_{(x/2)}Ti_6O_{14}$ with the element M2, that is, making values of the subscripts y and z larger than 0, a significant improvement in electron conductivity of the titanium-containing oxide becomes possible, and both of more excellent large current characteristics and more excellent life property can be achieved. However, if values of the subscripts y and z exceed 3, heterogenous phases that inhibit life property may be generated. Each value of the subscripts y and z is preferably not less than 0.01, and is more preferably within ranges of $0.01 \leq y \leq 1$ and $0.01 \leq z \leq 1$. When each value of the subscripts y and z is more than 0, higher output performance can be realized. M2 is preferably at least one element selected from the group consisting of Zr, V, Nb, Ta, Mo, W, and P, and is more preferably at least one element of V and Nb.

In the battery active material according to the first embodiment, the titanium-containing oxide, for example, may be in particulate form. The titanium-containing oxide in particulate form, for example, may be primary particles (single particles), or may be secondary particles from the agglomeration of primary particles. When particles of the titanium-containing oxide are secondary particles, from a viewpoint of the life property, the compression strength of the secondary particles is preferably not less than 10 MPa.

When the battery active material according to the first embodiment contains secondary particles of the titanium-containing oxide, the average secondary particle size is preferably 1 μm to 100 μm. Secondary particles with the average particle size within this range can be easily handled in industrial production, the mass and the thickness of a coating film for fabricating an electrode can be made uniform, and reduction of the surface smoothness of the electrode can be prevented. The average secondary particle size is more preferably 3 μm to 30 μm.

Whether or not the battery active material contains secondary particles can be confirmed, for example, by observation with a scanning electron microscope (SEM).

The average particle size of primary particles contained by secondary particles is preferably 1 nm to 10 μm. Primary particles with the average particle size within this range can be easily handled in the industrial production, and can promote diffusion in solid for lithium ions in the titanium-containing oxide. The average particle size of the primary particles is more preferably 10 nm to 1 μm.

Primary particles are preferably isotropic particles. In the present specification, isotropic primary particles mean particles with not more than 3 of aspect ratio. Whether or not the primary particles are isotropic particles can be confirmed by observation with a scanning electron microscope (SEM).

Specific surface area measured by BET method of secondary particles is preferably 5 $m^2$/g or more and 50 $m^2$/g or less. Not less than 5 $m^2$/g of specific surface area makes securing sufficient inserting and extracting sites of lithium ions possible. If the specific surface area is not more than 50 $m^2$/g, handling in the industrial production is easy.

The battery active material according to the first embodiment may include particles of the titanium-containing oxide, and also surface layer formed on at least a part of surfaces of these particles and containing at least one element of carbon and nitrogen.

The surface layer containing carbon element can exhibit lithium-ion permeability, and can also exhibit more excellent conductivity than that of the titanium-containing oxide. Thus, the surface layer containing carbon element can enhance electron conductivity of the particles of the titanium-containing oxide. Moreover, the surface layer containing carbon element can inhibit side reactions with an electrolytic solution which induce increased resistance of the battery. The content of the carbon element in a battery active material is, based on the mass of the battery active material, preferably from 0.01% by mass to 10% by mass. The content within this range can secure sufficient capacity and enhance electron conductivity. The content of the carbon element, based on the mass of the battery active material, is more preferably from 0.01% by mass to 3% by mass. The content of the carbon element, based on the mass of the battery active material, is further preferably 1% by mass to 3% by mass. The content of the carbon element in a battery active material can be measured with, for example, the high-frequency induction heating infrared absorption method. In addition, carbon element existing areas can be known by performing carbon mapping on a cross section of an active material via TEM-EDX, and the like.

The surface layer containing nitrogen element can exhibit lithium-ion permeability, as well, can exhibit more excellent conductivity than that of the titanium-containing oxide. Thus, the surface layer containing nitrogen element can enhance electron conductivity of the particles of the titanium-containing oxide. The content of the nitrogen element in a battery active material is, based on the mass of the battery active material, preferably from 0.01% by mass to 3% by mass. The content within the range can secure sufficient capacity and enhance electron conductivity. The content of the nitrogen element in a battery active material can be measured, for example, by melting in an inert gas, and using a thermal conductivity detector (for example, ONH836, made by LECO corp.). In addition, nitrogen element existing areas can be known by performing carbon mapping on a cross section of an active material via TEM-EDX, and the like.

The battery active material according to the first embodiment may contain the elements described above, as well as not more than 1000 mass ppm of unavoidable impurities due to manufacturing processes.

The content of each element in the battery active material can be measured via inductively coupled plasma (ICP) emission spectrophotometry.

The battery active material according to the first embodiment may be manufactured, for example, in the following way:

First, as Li source, a lithium compound, such as lithium hydroxide, lithium oxide, and lithium carbonate, is provided. And, as Na source, a sodium compound, such as sodium hydroxide, sodium oxide, and sodium carbonate, is provided. Predetermined amounts thereof are dissolved in pure water to prepare a starting solution. To this solution, by adding titanium oxide, an oxide of metallic element M1, and an optional oxide of element M2, so that atomic ratios of lithium, sodium, titanium, M1, and M2 become predetermined ratios, and a mixed solution is prepared. For example, in a case of preparing a titanium-containing oxide with a composition formula of $Li_2NaSr_{0.5}Ti_6O_{14}$, starting raw materials are added so that atomic ratios of lithium:sodium:strontium:titanium in the mixed solution become 2:1:0.5:6.

Next, the obtained mixed solution is dried while stirring, and a sintering precursor is obtained. The drying method includes spray drying, granulation drying, freeze-drying, or a combination of these. Then, the obtained sintering precursor is sintered, and a titanium-containing oxide is obtained. Sintering may be performed in an air atmosphere, or may be performed in an oxygen atmosphere, or in an inert atmosphere such as argon.

In the step described above, not dissolving the Li source and the Na source in pure water and simply mixing them is possible, but in order to more uniformly mix the raw materials and to inhibit generation of impurity phases, it is preferable to perform the step described above.

Sintering the sintering precursor (mixed raw materials) may be performed for 30 minutes to 24 hours at 680° C. to 1200° C., and is preferably performed for an hour to 10 hours at 720° C. to 1100° C.

A sintering temperature lower than 680° C. induces insufficient reaction between the titanium oxide and the lithium compound, impurity phases such as anatase-type $TiO_2$, rutile-type $TiO_2$, and $Li_2TiO_3$ increase, and the capacity decreases. A sintering temperature higher than 1200° C. induces excessive growth of the crystallite size, and reduces large-current characteristics.

The titanium-containing oxide obtained by the sintering described above may be ground and re-sintered under the conditions described below:

Grinding may be performed with, for example, a mortar, a ball mill, a sand mill, a vibration ball mill, a planetary ball mill, a jet mill, a counter jet mill, a swirling airflow-type jet mill, and a sieve. Wet grinding where known liquid grinding aids, such as water, ethanol, ethylene glycol, benzene, or hexane, coexist during grinding may be also utilized. Grinding aids are effective for improving grinding efficiency and increasing the fine powder amount. Grinding with a ball mill using balls made of zirconia as the medium is more preferable, and wet grinding with a grinding aid is preferable. In addition, organic substances such as polyols which improve grinding efficiency may be added as grinding aids. The types of polyols are not especially limited, and pentaerythritol, triethylolethane, or trimethylolpropane, for example, may be used solely or in combination.

Re-sintering may be performed in the air atmosphere, or may be performed in an oxygen atmosphere, or in an inert atmosphere such as argon. Re-sintering may be performed for one minute to 10 hours at 250° C. to 900° C. A re-sintering temperature of 900° C. or higher induces excessive sintering of ground powder, and even if for short time, crushes fine pores. A re-sintering temperature lower than 250° C. cannot remove impurities adhered during wet grinding (organic substances), and impair battery performance. Re-sintering is preferably performed for between 10 minutes and 3 hours at 400° C. to 700° C.

Moreover, the pH value of the titanium-containing oxide is preferably within a range of 10.0 to 11.2. The reasons therefor are as follows: During sintering the titanium-containing oxide, basic compounds such as lithium carbonate, sodium carbonate, lithium hydroxide, and sodium hydroxide can be by-produced from an unreacted Li component and/or Na component not incorporated into the titanium-containing oxide. When these basic compounds derived from an unreacted Li component and/or Na component remain on the surface of the titanium-containing oxide particles, these basic compounds may be electrochemically reduced, or may react with the nonaqueous electrolyte and generate carbon dioxide and hydrocarbon gases. Furthermore, these side reactions may form organic films to become resistant components on the surface of the active material. When the pH value of the titanium-containing oxide is smaller than 11.2, amounts of basic compounds described above on the surface of the titanium-containing oxide particles are sufficiently small. Thus, by using the battery active material comprising such titanium-containing oxide particles, battery performance, especially the cycle property at high-temperatures and output characteristics can be improved.

However, when the titanium-containing oxide is mechanically ground under the conditions described above, unreacted Li components and Na components are often exposed on the surface, which makes the pH value larger than 11.2, and impairs battery performance. Accordingly, performing re-sintering after grinding is preferable. Re-sintering can incorporate unreacted Li components and Na components exposed on the surface into the active material, and can reduce amounts of unreacted Li components and Na components remaining on the surface. That is, performing re-sintering after grinding can keep the pH value not higher than 11.2.

In the step of reacting Li the source such as lithium hydroxide and lithium carbonate and Na source such as sodium hydroxide and sodium carbonate with titanium oxide (for example, anatase-type $TiO_2$, rutile-type $TiO_2$), which are raw materials of the titanium-containing oxide, by reducing the adding ratios of the Li source and Na source, surplus Li components and Na components such as lithium carbonate and sodium carbonate by-product may be reduced. However, if adding ratios of Li source and Na source are reduced, ratios of Li and Na in the obtained active material are reduced, as a result, a capacity of the titanium-containing oxide is reduced. Accordingly, in order to keep the capacity high, not reducing the adding ratios of the Li source and Na source, but keeping the pH value of the obtained active material not smaller than 10 is preferable.

From the viewpoints of maintaining electrical capacity and reducing side reactions, a pH value of 10.3 to 11.1 is preferable.

Moreover, the pH value of the titanium-containing oxide can be measured as follows: That is, 1 g of the titanium-containing oxide is dispersed in 50 mL of pure water (25° C.), agitated for approximately 10 minutes, then the active material is filtered, and a filtrate is obtained. The pH value of the filtrate is defined as a pH value of the titanium-containing oxide. The pH-measuring method and the pH-measuring apparatus are based on JIS Standards (JIS Z8802, JIS Z8805), and the pH value of the filtrate is determined to be that of the titanium-containing oxide.

[Analyzing Methods of Active Material for Battery]

Then, as for the battery active material, a method of measuring content of each element using ICP emission spectrophotometry, a method of measuring carbon amount, a method of measuring nitrogen amount, a method of measuring average particle size of secondary particles, a method of measuring average particle size of primary particles, and a method of measuring specific surface area will be explained.

Incidentally, when incorporated in a battery, a battery active material can be taken out, for example, as follows: First, the battery is put into a discharged state. For example, by making the battery discharged up to the rated discharge end-voltage at 25° C. with 0.1 C current, the battery can be put into the discharged state. Next, the battery in a discharged state is disassembled, an electrode (for example negative electrode) is taken out. The electrode taken out is washed with, for example, methyl ethyl carbonate. The washed electrode is put into water, and the electrode layer is deactivated in water. From the deactivated electrode, a battery active material can be extracted by using a centrifugal separator and the like.

The extracted battery active material may still contain a binder and a conductive agent. For example, when polyvinylidene fluoride is contained in the extracted battery active material as binder, the binder is washed out with N-methyl-2-pyrrolidone and the like, then the conductive agent can be removed with a mesh having appropriate opening. When small amounts of the binder and conductive agent remain, they may be removed by heat treatment (for example, for 30 minutes at 250° C.) in the atmosphere.

(Method of Measuring Contents of Elements by ICP Emission Spectrophotometry)

Measurement of contents of elements by ICP emission spectrophotometry can be performed, for example, as follows: The battery active material extracted in the step described above is weighed and put into a container, melted with an acid or an alkali, and a measuring solution is obtained. By analyzing this measuring solution with ICP emission spectrophotometry in a measuring apparatus (for example, SPS-1500V, made by SII Nanotechnology Inc.), the content of each element in the battery active material can be measured.

Contents of added elements in the active material can be measured by an emission spectrophotometric analyzer. When another active material is also contained in the electrode, element containing amounts can be measured as follows: The negative electrode active materials taken out from the electrode are analyzed by TEM-EDX to specify the crystal structure of each particle via the selected-area electron diffraction method. Particles having the diffraction patterns assigned to a general formula of $Li_{(2+w)}Na_2Ti_6O_{14}$ are selected, EDX analysis is performed to the selected particles, and the content of each element can be determined. In diffraction patterns of particles of compounds represented by the general formula described above, peak positions may be a little shifted from the diffraction patterns assigned to $Li_{(2+w)}Na_2Ti_6O_{14}$, depending on values of subscripts x, y, and z, and a metallic element M1 and an element M2 in the general formula of $Li_{(2+w)}Na_{(2-x)}M1_{(x/2)}Ti_{(6-y)}M2_zO_{14}$. However, diffraction patterns of particles of compounds represented by the general formula described above can be identified to be similar to those assigned to the general formula of $Li_{(2+w)}Na_2Ti_6O_{14}$.

(Measuring Method of Carbon Amount)

Content of carbon element in the active material can be measured, for example, by removing the conductive agent from the battery active material extracted from the electrode as described above, drying the battery active material thus obtained for 12 hours at 150° C., weighing and putting into a container, and measuring with a measuring apparatus (for example, CS-444LS, made by LECO Inc.).

When another active material is also contained in the electrode, the carbon amount can be measured as follows: The active materials taken out from the electrode are analyzed by TEM-EDX to specify crystal structure of each particle via the selected-area electron diffraction method. Particles having the diffraction patterns assigned to a titanium-containing oxide are selected, and carbon amount of each particles selected is determined. Moreover, if carbon mapping with EDX is performed, carbon element existing areas can be known.

(Measuring Method of Nitrogen Amount)

Content of nitrogen element in the active material can be measured, for example, by melting the battery active material extracted from the electrode in inert gas, and measuring in a thermal conductivity detector (for example, ONH836, made by LECO Inc.).

When another active material is also contained in the electrode, the nitrogen amount can be measured as follows: The active materials taken out from the electrode are analyzed by TEM-EDX to specify crystal structure of each particle by using selected-area electron diffraction method. Particles having the diffraction patterns assigned to a titanium-containing oxide are selected, and nitrogen amount of each particles selected is determined. Moreover, if nitrogen mapping with EDX is performed, nitrogen element existing areas can be known.

(Measurement Method of Average Particle Size of Secondary Particles)

The measurement method of the average particle size of secondary particles of the active material is as described below. As a measurement apparatus, a laser diffraction particle size distribution analyzer (for example, SALD-300 manufactured by Shimadzu Corporation) can be used. First, about 0.1 g of a sample, 1 mL to 2 mL of surfactant, and 1 mL to 2 mL distilled water are put into a beaker to obtain mixture, and the mixture is thoroughly stirred. The mixture is injected into a stirring water tank, and a sample solution is prepared in this tank. Using the sample solution, luminosity distribution is measured 64 times at 2 second intervals, and the particle size distribution data is analyzed.

(Confirmation Method of Average Particle Size of Primary Particles)

The average primary particle size of the active material can be confirmed by observation with a scanning electron microscope (SEM). Specifically, an average value of 10 typical particles, extracted from a typical field of vision, is obtained, and the average value is decided as the average primary particle size.

(Measurement Method of Specific Surface Area)

As the method of measuring the specific surface area, a method in which a molecule whose adsorption occupancy area is known is adsorbed on the surface of a powder particle at a temperature of liquid nitrogen and the specific surface area of the sample is obtained from the adsorption amount can be employed. The most frequently used method is a BET method based on the low temperature/low humidity physical adsorption of an inert gas. This method is based on the best-known theory as the method of calculating the specific surface area in which the Langmuir theory as a monolayer adsorption theory is extended to multilayer adsorption. The specific surface area determined by the above method is referred to as "BET specific surface area".

(Confirmation Method of Crystal Structure)

Next, the confirmation method of a crystal structure of the active material is described.

The crystal structure of the active material can be confirmed by wide-angle X-ray diffraction (XRD).

The wide-angle X-ray diffraction for the active material is performed as follows: First, a target sample is ground until the average particle size becomes about 5 μm. The average particle size can be found, for example, by laser diffraction, or the like, as described above. The ground sample is filled in a holder part having a depth of 0.2 mm, formed on a glass sample plate. At this time, pay attention so that the sample is sufficiently filled in the holder part. In addition, pay attention so that cracks or voids are not generated due to insufficient filling of the sample. Next, the sample is thoroughly pressed with another glass plate from the outside to smooth the sample. At this time, pay attention so that an uneven surface protruding or depressing from a reference surface of the holder due to insufficient or excessive filling amount is not formed. Next, the glass plate in which the sample is filled is placed in a wide-angle X-ray diffraction apparatus, and a diffraction pattern is obtained using Cu—Kα rays.

If the sample has a high orientation, positional deviation of peaks may be caused or a peak intensity ratio may be changed, depending on how the sample is filled. For such a sample, the sample is molded into pellets, and then the measurement is performed. The pellet may be a pressurized powder having, for example, a diameter of 10 mm and a thickness of 2 mm. The pressurized powder can be formed by applying a pressure of about 250 MPa to the sample for 15 minutes. The obtained pellets are placed in the X-ray diffraction apparatus, and the surface thereof is measured. When the measurement is performed using such a method, variations in measurement results caused by the operator can be excluded, and high repeatability can be obtained.

When the wide-angle X-ray diffraction measurement is performed for the active material contained in the electrode, for example, it can be performed as follows:

First, in order to comprehend the crystal state of the active material, the lithium ions are completely removed from the active material by using the procedure as described above. For example, when it is used as the negative electrode, the battery is completely discharged. However, there may be sometimes lithium ions remaining even in the discharged state. Next, the battery is disassembled in a glove box filled with argon, and is washed with an appropriate solvent. For example, ethyl methyl carbonate may be used. The washed electrode is cut into a sample having the same area as that of a holder in the wide angle X-ray diffraction apparatus, and the sample is directly stuck to the glass holder, which may be measured. At this time, XRD is previously measured depending on the kind of the metal foil of the electrode current collector, and where a peak derived from the current collector appears is comprehended. In addition, the presence or absence of materials which are mixed with the active material, such as the conductive agent and the binder, is previously comprehended. When the peaks of the current collector is overlapped with the peaks of the active material, it is desirable that the active material is peeled off from the current collector, and then the measurement is performed. This is performed in order to separate the overlapped peaks from each other, when the peak intensity is quantitatively measured. If these have been previously comprehended, this operation can be of course omitted. The electrode mixture layer may be physically peeled off from the current collector, but the peeling-off can be easily performed by application of ultrasonic waves in a solvent. The wide-angle X-ray diffraction measurement for the active material can be performed by measuring the wide-angle X-ray diffraction of the thus recovered electrode mixture layer.

The thus obtained results of the wide-angle X-ray diffraction are analyzed according to a Rietveld method. In the Rietveld method, a diffraction pattern, which is obtained by calculating from a crystal structure model previously presumed, is fully fitted to measured values, whereby parameters (a lattice constant, atomic coordinate, occupancy rate, and the like) concerning the crystal structure can be refined, and characteristics of a crystal structure of the active material and the positions (sites) of added elements to be measured can be examined.

The battery active material according to the first embodiment explained above can be used in either a negative electrode or a positive electrode of a nonaqueous electrolyte battery. The active material can exhibit stable input and output over a wide SOC range together with large capacity, can exhibit high voltage, and can realize a nonaqueous electrolyte battery with excellent cycle property, without variation between applications in a negative electrode or in a positive electrode.

When the battery active material according to the first embodiment is used in a positive electrode, as an active material in the negative electrode as the counter electrode, for example, metallic lithium, lithium alloys, or carbon materials such as graphite and coke may be used.

When the battery active material according to the first embodiment is used in a negative electrode as a negative electrode active material, the active material may be used solely, or may be used in combination with other active materials. Such other active materials include, for example, lithium-titanium composite oxides having a spinel-type crystal structure ($Li_4Ti_5O_{12}$, and the like), titanium composite oxide having an anatase-type, a rutile-type, or a monoclinic β-type crystal structure (a-$TiO_2$, r-$TiO_2$, $TiO_2$(B), and the like), and an iron composite sulfide (FeS, $FeS_2$, and the like).

Similarly, when the battery active material according to the first embodiment is used in a positive electrode as a positive electrode active material, the active material may be used solely, or may be used in combination with other active materials. Such other active materials include, for example, lithium-titanium composite oxides having spinel-type crystal structure ($Li_4Ti_5O_{12}$, and the like), titanium composite oxide having an anatase-type, a rutile-type, or a monoclinic β-type crystal structure (a-$TiO_2$, r-$TiO_2$, $TiO_2$(B), and the like), and an iron composite sulfide (FeS, $FeS_2$, and the like).

According to the first embodiment explained above, the battery active material is provided. The active material includes titanium-containing oxide represented by a general formula of $Li_{(2+w)}Na_{(2-x)}M1_{(x/2)}Ti_{(6-y)}M2_zO_{14}$. M1 is at least one metallic element selected from the group consisting of Sr, Ba, and Pb. M2 is at least one element selected from the group consisting of metallic elements M (excluding Ti and the metallic element M1) and P. This battery active material can exhibit stable input and output over a wide SOC range together with large capacity, and inserting and extracting reactions of lithium can progress at lower potential than that of lithium titanate in the active material. Because of these, the battery active material according to the first embodiment can realize a nonaqueous electrolyte battery that can exhibit excellent input-output characteristics, excellent life property, and a high voltage.

(Second Embodiment)

According to the second embodiment, a nonaqueous electrolyte battery is provided. The nonaqueous electrolyte battery includes a positive electrode, a negative electrode, and a nonaqueous electrolyte. The negative electrode contains the battery active material according to the first embodiment.

The nonaqueous electrolyte battery according to the second embodiment may further include a separator provided between the positive electrode and the negative electrode. The positive electrode, the negative electrode, and the separator can form an electrode group. The nonaqueous electrolyte can be held in the electrode group.

The electrode group may have, for example, a stacked type structure. In the stacked type electrode group, multiple positive electrodes and multiple negative electrodes are alternately laminated with a separator sandwiched between them.

Alternatively, the electrode group may have a coiled type structure. The coiled type electrode group can be formed by coiling a laminate, obtained by laminating the positive electrode, the separator, and the negative electrode.

The nonaqueous electrolyte battery according to the second embodiment may further include a container member housing the electrode group and the nonaqueous electrolyte, a negative electrode terminal, and a positive electrode terminal.

The positive electrode and the negative electrode can be spatially separated from each other via the separator. The negative electrode terminal can be electrically connected to the negative electrode. The positive electrode terminal can be electrically connected to the positive electrode.

The container member, the negative electrode, the positive electrode, the nonaqueous electrolyte, the separator, the positive electrode terminal, and the negative electrode terminal are explained in detail below.

1) Exterior Member

The container member is formed from, for example, a laminate film having a thickness of 0.5 mm or less. Alternatively, the container member may be a metal container having, for example, a wall thickness of 1.0 mm or less. The wall thickness of the metal container is more preferably 0.5 mm or less.

The shape of the container member can be selected from, for example, a flat (thin) shape, a square shape, a cylindrical shape, a coin shape, and a button shape. Depending on the battery size, examples of the container member may include a container member for a small battery which is mounted to a portable electronic device or a container member for a large battery which is mounted to a two- or four-wheeled vehicle.

As the laminate film, for example, a multilayer film containing resin layers and a metal layer sandwiched between the resin layers is used. The metal layer is preferably an aluminum foil or an aluminum alloy foil for the weight reduction. As the resin layer, polymer materials such as polypropylene (PP), polyethylene (PE), nylon, and polyethylene terephthalate (PET) may be used. The laminate film can be sealed by thermal fusion bonding to form the shape of the container member.

The metal container is fabricated from, for example, aluminum, aluminum alloy, or the like. An alloy containing an element such as magnesium, zinc, or silicon is preferable as the aluminum alloy. When the alloy contains a transition metal such as iron, copper, nickel, or chromium, the content thereof is preferably 100 mass ppm or less.

2) Negative Electrode

The negative electrode may include a negative electrode current collector, and a negative electrode layer formed on one side or both sides of the negative electrode current collector.

The negative electrode current collector is preferably an aluminum foil or an aluminum alloy foil, each of which is electrochemically stable in a potential range nobler than 1 V (vs. Li/Li+), the aluminium alloy foil containing an element such as Mg, Ti, Zn, Mn, Fe, Cu, and Si. These materials can prevent the degradation due to melting and corrosion of the current collector during the over-discharge cycle. The contents of transition metal such as iron, copper, nickel, or chromium are preferably 1% by mass or less.

The negative electrode layer can contain a negative electrode active material, a conductive agent, and a binder.

The battery active material according to the first embodiment may be contained in the negative electrode active material. The negative electrode active material may contain, as described in the first embodiment, a negative electrode active material other than the battery active material according to the first embodiment.

The negative electrode active material has preferably a specific surface area of 0.5 $m^2/g$ to 50 $m^2/g$. When the specific surface area is 0.5 $m^2/g$ or more, insertion and extraction sites of lithium ions can be sufficiently secured. When the specific surface area is 50 $m^2/g$ or less, the handling in industrial production is easy. The specific surface area is more preferably from 3 $m^2/g$ to 30 $m^2/g$.

A conductive agent can enhance the current-collecting performance of the negative electrode active material, as well as, can reduce contact resistance between the active material and the current collector. As a conductive agent, for example, carbon-based materials, metallic powders such as aluminum powder, and conductive ceramics such as TiO may be used. Examples of carbon-based materials include, for example, acetylene black, carbon black, coke, carbon fiber, and graphite. More preferable carbon-based materials are coke which had been subjected to heat-treatment at 800° C. to 2000° C. and has an average particle size of not larger than 10 μm, graphite, TiO powder, and carbon fiber having average particle size of not larger than 1 μm. A BET specific surface area measured according to $N_2$ absorption for carbon-based materials is preferably not less than 10 $m^2/g$.

The binder can bind the negative electrode active material to the conductive agent. Examples of the binder may include polytetrafluoroethylene (PTFE), polyvinylidene fluoride (PVdF), fluororubber, and styrene-butadiene rubber.

It is preferable that, blending ratios of the negative electrode active material, the conductive agent, and the binder in the negative electrode layer are from 70% by mass to 96% by mass, from 2% by mass to 28% by mass, and from 2% by mass to 28% by mass, respectively. When the content of the conductive agent is 2% by mass or more, the current-collecting performance of the negative electrode layer can be improved, and the large-current characteristic of the nonaqueous electrolyte battery can be improved. When the content of the binder is 2% by mass or more, the binding property between the negative electrode layer and the current collector can be increased, thus resulting in an improved cycle characteristic. On the other hand, in order to increase the capacity, it is preferable to adjust the content of each of the conductive agent and the binder to 28% by mass or less.

The negative electrode can be produced by suspending the negative electrode active material, the conductive agent, and the binder in a general-purpose solvent to prepare a slurry, applying a current collector with the slurry and drying it, and then pressing. The negative electrode may also be produced by molding the active material, the conductive agent, and the binder into pellets, and arranging the pellets on the current collector as a negative electrode layer.

3) Positive Electrode

The positive electrode may include a positive electrode current collector, and a positive electrode layer formed on one side or both sides of the positive electrode current collector.

The positive electrode current collector is preferably, for example, an aluminum foil or an aluminum alloy foil containing an element such as Mg, Ti, Zn, Mn, Fe, Cu, Si.

The positive electrode layer may contain a positive electrode active material, a conductive agent, and a binder.

As the positive electrode active material, for example, oxides, polymers, and the like can be used.

As the oxide, for example, manganese dioxide ($MnO_2$), iron oxide, copper oxide, and nickel oxide, each of which inserts lithium; lithium-manganese composite oxide (for example, $Li_xMn_2O_4$ and $Li_xMnO_2$); lithium-nickel composite oxide (for example, $Li_xNiO_2$), lithium-cobalt composite oxide ($Li_xCoO_2$), lithium-nickel-cobalt composite oxide (for example, $LiNi_{1-y}Co_yO_2$), lithium-manganese-cobalt composite oxide (for example, $Li_xMn_yCo_{1-y}O_2$), lithium-nickel-manganese-cobalt composite oxide (for example, $Li_x(Ni_a Mn_b Co_c)O_2$, wherein a+b+c=1), lithium-manganese-nickel composite oxide having a spinel structure ($Li_xMn_{2-y}Ni_yO_4$), lithium-phosphorus oxide having an olivine structure (for example, $Li_xFePO_4$, $Li_xFe_{1-y}Mn_yPO_4$, $Li_xCoPO_4$), iron sulfate ($Fe_2(SO_4)_3$), or vanadium oxide (for example, $V_2O_5$) may be used. In the formulae, x and y are preferably 0<x≤1 and 0<y≤1.

As the polymer, for example, conductive polymer materials such as polyaniline and polypyrrole, and disulfide polymer materials may be used. Sulphur (S) and carbon fluoride may also be used as the active material.

Examples of the preferable positive electrode active material may include lithium-manganese composite oxide (for example, $Li_xMn_2O_4$), lithium-nickel composite oxide ($Li_xNiO_2$), lithium-cobalt composite oxide ($Li_xCoO_2$), lithium-nickel-cobalt composite oxide ($Li_xNi_{1-y}Co_yO_2$), lithium-nickel-manganese-cobalt composite oxide (for example, $Li_x(Ni_aMn_bCo_c)O_2$, wherein a+b+c=1), lithium-manganese-nickel composite oxide having a spinel structure ($Li_xMn_{2-y}Ni_yO_4$), lithium-manganese-cobalt composite oxide ($Li_xMn_yCo_{1-y}O_2$), and lithium iron phosphate (for example, $Li_xFePO_4$) having a olivine structure, each of which exhibits a high positive electrode voltage. In the formula, x and y are preferably 0≤x≤1 and 0≤y≤1.

From the viewpoint of high-temperature durability, more preferable positive electrode active materials are lithium-manganese composite oxides ($Li_xMn_2O_4$), lithium-nickel-manganese-cobalt composite oxides (for example, $Li_x(Ni_aMn_bCo_c)O_2$, wherein a+b+c=1), and lithium iron phosphates ($Li_xFePO_4$). These active materials have high structural stability and excellent reversibility in charging and discharging, and in combination with the negative electrode active material described above, can achieve a higher life property.

Nonaqueous electrolyte batteries each including a negative electrode containing the battery active material according to the first embodiment, and a positive electrode containing the lithium-manganese composite oxide ($LiMn_2O_4$) having a spinel-type crystal structure, or a positive electrode containing the lithium-nickel-manganese-cobalt composite oxide (for example, $Li_x(Ni_aMn_bCo_c)O_2$, wherein a+b+c=1) can constitute, by a five-series connection, a 12 V system that can exhibit an excellent compatibility with a lead acid storage battery. Nonaqueous electrolyte batteries each including a negative electrode containing the battery active material according to the first embodiment, and a positive electrode containing the lithium iron phosphate ($Li_xFePO_4$) having an olivine-type crystal structure can constitute, by a six-series connection, a 12 V system that can exhibit an excellent compatibility with a lead acid storage battery. Such systems can provide a battery module and a battery pack that are excellent in high-temperature durability and can be used in an engine room.

The conductive agent can increase the current collecting performance of the active material, and suppress the contact resistance of the active material with the current collector. Examples of the conductive agent may include carbonaceous substances such as acetylene black, carbon black, and graphite.

The binder can bind the active material to the conductive agent. Examples of the binder may include polytetrafluoroethylene (PTFE), polyvinylidene fluoride (PVdF), and fluororubber.

It is preferable that the blending ratios of the positive electrode active material, the conductive agent, and the binder in the positive electrode layer are from 80% by mass to 95% by mass, from 3% by mass to 18% by mass, and from 2% by mass to 17% by mass, respectively. When the conductive agent is contained in a content of 3% by mass or more, the effects described above can be exhibited. When the conductive agent is contained in a content of 18% by mass or less, the decomposition of the nonaqueous electrolyte on the conductive agent surface can be reduced during storage at a high temperature. When the binder is contained in a content of 2% by mass or more, a sufficient positive electrode strength can be obtained. When the binder is contained in a content of 17% by mass or less, the blending amount of the binder, which is an insulator in the positive electrode, can be reduced, and the internal resistance can be reduced.

The positive electrode can be produced, for example, by suspending the positive electrode active material, the conductive agent, and the binder in a general-propose solvent to prepare a slurry, coating a current collector with the slurry and drying it, and then pressing it. The positive electrode may also be prepared by molding the positive electrode active material, the conductive agent, and the binder into pellets, and arranging the pellets on the current collector as a positive electrode layer.

4) Nonaqueous Electrolyte

As the nonaqueous electrolyte, for example, a liquid nonaqueous electrolyte, prepared by dissolving an electrolyte in an organic solvent, or a gel nonaqueous electrolyte which is a composite of a liquid electrolyte and a polymer material may be used.

The liquid nonaqueous electrolyte is preferably one which is prepared by dissolving an electrolyte in an organic solvent at a concentration of 0.5 to 5.0 mol/L.

Examples of the electrolyte may include lithium salts such as lithium perchlorate ($LiClO_4$), lithium hexafluorophosphate ($LiPF_6$), lithium tetrafluoroborate ($LiBF_4$), lithium hexafluoroasenate ($LiAsF_6$), lithium trifluoromethanesulfonate ($LiCF_3SO_3$), bis-trifluoromethyl sulfonyl imide lithium [$LiN(CF_3SO_2)_2$]; and mixtures thereof. Electrolytes which are not easily oxidized even at a high potential are preferable, and $LiPF_6$ is most preferable.

Examples of the organic solvent may include cyclic carbonates such as propylene carbonate (PC), ethylene carbonate (EC), and vinylene carbonate; linear carbonates such as diethyl carbonate (DEC), dimethyl carbonate (DMC), and methyl ethyl carbonate (MEC); cyclic ethers such as tetrahydrofuran (THF), 2-methyl tetrahydrofuran (2-MeTHF), and dioxolane (DOX); linear ethers such as dimethoxyethane (DME) and diethoxyethane (DEE); γ-butyrolactone (GBL), acetonitrile (AN), and sulfolane (SL). One organic solvent among these may be used alone or two or more organic solvents among these may be used as a mixed solvent.

Examples of the polymer material may include polyvinylidene fluoride (PVdF), polyacrylonitrile (PAN), and polyethylene oxide (PEO).

The preferable organic solvent may include mixed solvents of at least two solvents selected from the group consisting of propylene carbonate (PC), ethylene carbonate (EC), and diethyl carbonate (DEC); or mixed solvents containing γ-butyrolactone (GBL). When such a mixed solvent is used, a nonaqueous electrolyte battery exhibiting an excellent high temperature property can be realised.

5) Separator

The separator may be formed from, for example, a porous film or a non-woven fabric of a synthetic resin, each of which contains polyethylene, polypropylene, cellulose, or polyvinylidene fluoride (PVdF). Preferable porous films may include porous films formed from polyethylene or polypropylene. Such a porous film can be melted at a given temperature to block electric current, and thus safety can be improved.

6) Negative Electrode Terminal

For the negative electrode terminal, for example, a material having electrical stability and electrical conductivity at a potential within a range of 1 V to 3 V based on the oxidation-reduction potential of lithium, can be used. The material may include specifically aluminum, and aluminum alloy containing an element such as Mg, Ti, Zn, Mn, Fe, Cu, or Si. It is preferable that the negative electrode terminal is formed from the same material as that of the negative electrode current collector in order to reduce the contact resistance with the negative electrode current collector.

7) Positive Electrode Terminal

For the positive electrode terminal, for example, a material exhibiting electrical stability and electrical conductivity at a potential within a range of 3 V to 4.25 V based on the oxidation-reduction potential of lithium, can be used. The material may include specifically aluminum, and aluminum alloy containing an element such as Mg, Ti, Zn, Mn, Fe, Cu, or Si. It is preferable that the positive electrode terminal is formed from the same material as that of the positive electrode current collector in order to reduce the contact resistance with the positive electrode current collector.

Next, one example of the nonaqueous electrolyte battery according to the second embodiment is explained, referring to the drawings.

First, a flat-shaped nonaqueous electrolyte battery as an example according to the second embodiment will be described with reference to FIGS. 2 and 3.

FIG. 2 is a schematic cross-sectional view showing a nonaqueous electrolyte battery, which is one example according to the second embodiment. FIG. 3 is an enlarged cross-sectional view of part A in FIG. 2.

The nonaqueous electrolyte battery 100 shown in FIGS. 2 and 3 includes a flat-shaped coiled electrode group 1. The flat-shaped coiled electrode group 1 includes, as shown in FIG. 3, a negative electrode 3, a separator 4, and a positive electrode 5. The separator 4 is sandwiched between the negative electrode 3 and the positive electrode 5. Such a flat-shaped coiled electrode group 1 can be formed, for example, by laminating the negative electrode 3, one separator 4, the positive electrode 5 and another separator 4 so that the one separator 4 is sandwiched between the negative electrode 3 and the positive electrode 5 to obtain a laminate, coiling the laminate while disposing the negative electrode 3 on the outside, and press-molding the laminate, as shown in FIG. 2.

The negative electrode 3 includes a negative electrode current collector 3a and a negative electrode layer 3b. The outermost portion of the negative electrode 3 has, as shown in FIG. 3, a structure in which the negative electrode layer 3b is formed on only one surface facing the center of the electrode group of the negative electrode current collectors 3a. In the other portion of the negative electrode 3, the negative electrode layers 3b are formed on both surfaces of the negative electrode current collector 3a.

The positive electrode 5 includes a positive electrode layer 5b formed on both surfaces of the positive electrode current collector 5a.

As shown in FIG. 2, in the vicinity of an outer peripheral edge of the coiled electrode group 1, the negative electrode terminal 6 is connected to the negative electrode current collector 3a at the outermost portion of the negative electrode 3, and the positive electrode terminal 7 is connected to the positive electrode current collector 5a at the inside portion of the positive electrode 5.

The coiled electrode group 1 is housed in a bag-shaped container 2 formed of a laminate film in which a metal layer is sandwiched between two resin layers.

The negative electrode terminal 6 and the positive electrode terminal 7 are extended from an opening of the bag-shaped container 2 to the outside. For example, a liquid nonaqueous electrolyte is injected into the bag-shaped container 2 through an opening thereof and housed in the bag-shaped container 2.

The bag-shaped container 2 is sealed by heat-sealing the opening while the negative electrode terminal 6 and the positive electrode terminal 7 are put in the opening. Thus, the coiled electrode group 1 and the liquid nonaqueous electrolyte are completely sealed in the bag-shaped container 2.

The nonaqueous electrolyte battery according to the second embodiment includes the battery active material according to the first embodiment, and can exhibit excellent input-output characteristics, an excellent life property, and high voltage.

(Third Embodiment)

According to a third embodiment, a battery module is provided. The battery module according to third embodiment includes the nonaqueous electrolyte batteries according to the second embodiment.

In the battery module according to the third embodiment, unit cells may be arranged so that they are connected electrically to each other in series or in parallel, or may be arranged with a combination of series connection and parallel connection.

For example, the battery module according to the third embodiment may include 6m nonaqueous electrolyte batteries each including a negative electrode containing the battery active material according to the first embodiment, a positive electrode containing an iron-containing phosphate compound having an olivine-type crystal structure, and a nonaqueous electrolyte. Here, m is an integer being not smaller than 1. The 6m nonaqueous electrolyte batteries may be connected in series with each other, and constitute the battery module. As explained in the second embodiment, the nonaqueous electrolyte batteries included in the battery module shown in this example can constitute, by the six-series connection, a 12 V system that can show an excellent compatibility with lead acid storage battery, and is excellent in high-temperature durability. Thus, the battery module shown in this example may be used in an engine room together with a lead acid storage battery.

Moreover, for example, the battery module according to the third embodiment may include 5n nonaqueous electrolyte batteries each including a negative electrode containing the battery active material according to the first embodiment, a positive electrode containing at least one selected from the group consisting of a lithium-manganese composite oxide having a spinel-type crystal structure and lithium-nickel-manganese-cobalt composite oxide having a layer structure, and a nonaqueous electrolyte. Here, n is an integer being not smaller than 1. The 5n nonaqueous electrolyte batteries may be connected in series with each other, and constitute a battery module.

As explained in the second embodiment, the nonaqueous electrolyte batteries included in the battery module shown in this example can constitute, by the five-series connection, a 12 V system that can show excellent compatibility with lead batteries, and is excellent in high-temperature durability. Thus, the battery module shown in this example may be used in an engine room together with a lead acid storage battery.

Next, an example of the battery module according to the third embodiment will be explained with reference to the drawings.

FIG. 4 is a schematic perspective view showing an example of the battery module according to the third embodiment. A battery module 23 shown in FIG. 4 includes five unit cells 21. Each of the five unit cells 21 is an example of the nonaqueous electrolyte battery according to the second embodiment.

The battery module 23 shown in FIG. 4 further comprises four leads 20. One lead 20 connects a negative electrode terminal 6 of one unit cell 21 and a positive electrode terminal 7 of neighboring another unit cell 21. Thus, five unit cells 21 are connected in series via four leads 20. That is, the battery module 23 shown in FIG. 4 is a five-series battery module.

As shown in FIG. 4, a positive electrode terminal 7 of one unit cell 21 among five unit cells 21 is connected to a positive electrode lead 28 for an external connection. In addition, a negative electrode terminal 6 of a unit cell 21 among five unit cells 21 is connected to a negative electrode lead 30 for an external connection.

The battery module according to the third embodiment includes nonaqueous electrolyte batteries according to the second embodiment, and can exhibit excellent input-output characteristics, an excellent life property, and high voltage.

(Fourth Embodiment)

According to a fourth embodiment, a battery pack is provided. The battery pack includes a nonaqueous electrolyte battery according to the second embodiment.

The battery pack according to the fourth embodiment may include one nonaqueous electrolyte battery or may include nonaqueous electrolyte batteries. When the battery pack according to the fourth embodiment includes nonaqueous electrolyte batteries, the unit cells may be arranged so that they are electrically connected to each other in series or in parallel, or may be arranged with a combination of series connection and parallel connection.

A plurality of nonaqueous electrolyte batteries may be electrically connected to each other in series, in parallel, or with a combination of series connection and parallel connection, to constitute a battery module. The battery pack according to the fourth embodiment may include a plurality of battery modules.

The battery pack according to the fourth embodiment may further comprise a protective circuit. The protective circuit has a function to control charging and discharging of the nonaqueous electrolyte battery. Alternatively, a circuit included in an equipment where the battery pack serves as a power source (for example, electronic devices, vehicles, and the like) may be used as the protective circuit for the battery pack.

Moreover, the battery pack according to the fourth embodiment may further comprise an energizing external terminal (a power distribution external terminal). The energizing external terminal is configured to externally output the current from the nonaqueous electrolyte battery, and to input the current to the nonaqueous electrolyte battery. In other words, when the battery pack is used as a power source, the current is externally provided via the energizing external terminal. Also, when the battery pack is charged, the charging current (including regenerative energy caused by power of vehicles such as automobiles) is provided to the battery pack via the energizing external terminal.

Alternatively, the battery pack according to the fourth embodiment can include the battery module according to the third embodiment.

Next, one example of the battery pack according to the fourth embodiment is explained, referring to the drawings.

Figure 6:
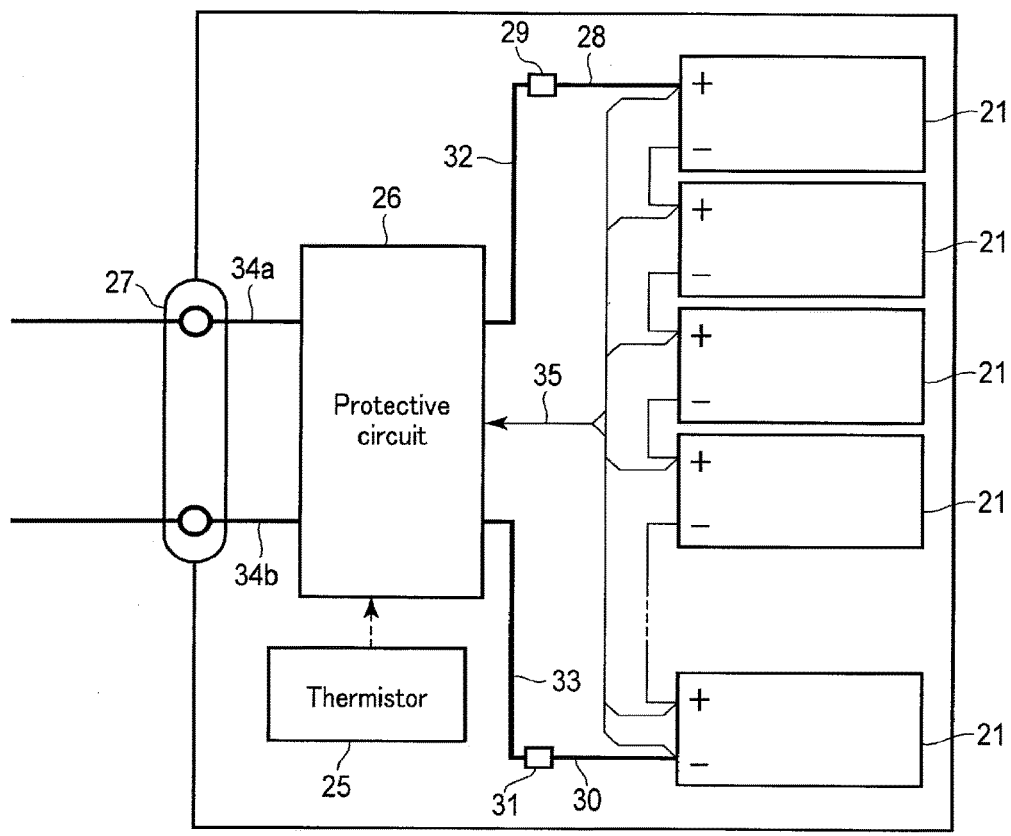
FIG. 6 is a block diagram showing an electric circuit of a battery pack shown in FIG. 5.

FIG. 5 is an exploded perspective view showing a battery pack of one example according to the fourth embodiment. FIG. 6 is a block diagram showing an electric circuit of the battery pack shown in FIG. 5.

A battery pack 200 shown in FIGS. 5 and 6 includes flat-shaped batteries 21 each having the same structure as that in the nonaqueous electrolyte battery 100 shown in FIG. 2 and FIG. 3. That is, the battery pack 200 includes nonaqueous electrolyte batteries each according to the second embodiment.

The unit cells 21 are stacked so that a negative electrode terminal 6 and a positive electrode terminal 7 extended to outside are arranged in the same direction, and fastened with an adhesive tape 22 to constitute a battery module 23. The unit cells 21 are, as shown in FIG. 6, electrically connected to each other in series.

A printed wiring board 24 is arranged opposed to the side face, of side faces of the battery module 23, from which the negative electrode terminals 6 and the positive electrode terminals 7 of the unit cells 21 are extended. On the printed wiring board 24, as shown in FIG. 6, a thermistor 25, a protective circuit 26, and a terminal 27 for passing electricity to an external device are mounted. An insulating plate (not shown) is attached to a surface of the printed wiring board 24 facing the battery module 23, in order to avoid unnecessary connections to electrical wiring of the battery module 23.

A positive electrode-side lead 28 is connected to the positive electrode terminal 7 of the unit cell 21 positioned in the bottom layer of the battery module 23, and the end thereof is inserted into a positive electrode-side connector 29 of the printed wiring board 24 to form an electrical connection. A negative electrode-side lead 30 is connected to the negative electrode terminal 6 of the unit cell 21 positioned in the top layer of the battery module 23, and the end thereof is inserted into a negative electrode-side connector 31 of the printed wiring board 24 to form an electrical connection. The connectors 29 and 31 are connected to the protective circuit 26 through wirings 32 and 33 formed on the printed wiring board 24.

The thermistor 25 detects a temperature of each of the unit cells 21, and the detection signals are transmitted to the protective circuit 26. The protective circuit 26 can shut down a plus-side wiring 34a and a minus-side wiring 34b between the protective circuit 26 and the terminal 27 for passing electricity to an external device under a predetermined condition. The predetermined condition may include, for example, a case where a signal in which the temperature of the unit cell 21 is a predetermined temperature or higher is received from the thermistor 25. Another example of the predetermined condition may include a case where over-charge, over-discharge, or over-current of the unit cells 21 is detected. The detection of the over-charge and the like is performed for the individual unit cell 21 or all unit cells 21. When the detection of the individual unit cell 21 is performed, the battery voltage may be detected, or the positive electrode potential or the negative electrode potential may be detected. In the latter case, a lithium electrode, which is used as a reference electrode, is inserted into individual unit cells 21. In the battery pack 200 shown in FIG. 5 and FIG. 6, a wiring 35 for detecting a voltage is connected to each of the unit cells 21, and detection signals are transmitted to the protective circuit 26 via the wiring 35.

Protective sheets 36 including rubber or a resin are arranged on three sides of the battery module 23, except for the side from which the positive electrode terminal 7 and the negative electrode terminal 6 are protruded.

The battery module 23 is housed in a housing container 37 together with the protective sheets 36 and the printed wiring board 24; that is, the protective sheets 36 are arranged on both of long-side inner surfaces of the housing container 37 and on one of short-side inner surfaces, and the printed wiring board 24 is arranged on the other side of the short-side inner surfaces. The battery module 23 is positioned in a space surrounded by the protective sheets 36 and the printed wiring board 24. A lid 38 is attached to a top surface of the housing container 37.

For fixation of the battery module 23, a heat-shrinkable tape may be used instead of the adhesive tape 22. In such a case, the protective sheets are placed on both sides of the battery module, heat-shrinkable tape is wound around them, and then the heat-shrinkable tape is heat-shrunk to bundle the battery module.

The battery pack 200 shown in FIG. 5 and FIG. 6 has a form in which multiple unit cells 21 are connected to each other in series; however, in the battery pack according to the fourth embodiment, multiple unit cells 21 may be connected to each other in parallel, in order to increase the battery capacity. Alternatively, in the battery pack according to the fourth embodiment, connection in series and connection in parallel of the multiple unit cells 21 may be combined. Assembled battery packs 200 may be further connected to each other in series or in parallel.

The battery pack 200 shown in FIG. 5 and FIG. 6 contains multiple unit cells 21, but the battery pack according to the fourth embodiment may contain one unit cell 21.

The aspect of the battery pack may be appropriately modified depending on the application. The battery pack according to this embodiment is preferably used in an application requiring an excellent cycle characteristic when a large current is taken out. Specifically, it is used, for example, as a power source for digital cameras, or as a battery mounted on a two- to four-wheeled hybrid electric car, two- to four-wheeled electric car, and an electric assist bicycle. In particular, it is preferably used as a battery mounted on vehicles.

In a vehicle having the battery pack according to the fourth embodiment mounted, the battery pack is configured to, for example, recover regenerative energy caused by power of the vehicle. Examples of the vehicle include two to four-wheeled hybrid electric automobiles, two to four-wheeled electric automobiles, electric assist bicycles, and trains (electric train).

The battery pack according to the fourth embodiment includes the nonaqueous electrolyte battery according to the second embodiment. As a result, the battery pack according to the fourth embodiment can exhibit excellent input-output characteristics, an excellent life property, and high voltage.

(Fifth Embodiment)

A automobile according to a fifth embodiment includes the battery pack according to the fourth embodiment.

Here, examples of the automobile include two to four-wheeled automobiles provided with a mechanism which stops the engine to suppress idling (start-stop system), two to four-wheeled hybrid electric automobiles, two to four-wheeled electric automobiles, and electric assist bicycles.

Figure 7:
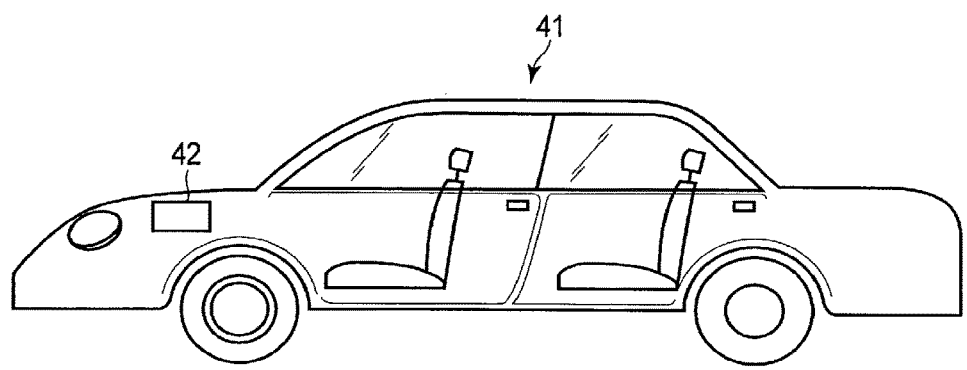
FIG. 7 is a schematic sectional view showing an example of an automobile according to a fifth embodiment.

An example of the automobile according to the fifth embodiment is shown in FIG. 7. As shown in FIG. 7, the automobile 41 according to the fifth embodiment has a battery pack 42 according to the fourth embodiment mounted in its engine room. Enabling placement of a battery pack in an automobile engine room to be under a high-temperature environment leads to shortening distances between the battery pack and electric drive system such as motors and inverters, reducing losses in input and output, and improving fuel efficiency.

In the automobile shown in FIG. 7, the battery pack is mounted in the engine room. However, mounting sites of the battery pack in automobiles are not limited to engine rooms. For example, the battery pack may also be mounted in rear parts of automobiles or under seats.

According to the fifth embodiment, a battery pack according to the fourth embodiment is mounted, and an automobile mounting an electrochemical apparatus that can exhibit excellent input-output characteristics, an excellent life 1 property, and high voltage can be provided.

EXAMPLES

Examples will be explained below; however, the present invention is not limited to the Examples described below without departing from the scope of the present invention.

<Synthesis of Active Materials>

Example 1

In Example 1, an active material of Example 1 was synthesized as follows:

As starting raw materials, lithium carbonate ($Li_2CO_3$), sodium carbonate ($Na_2CO_3$), strontium carbonate ($SrCO_3$), and anatase-type titanium oxide ($TiO_2$) were mixed so that molar ratio of Li:Na:Sr:Ti became 2:1:0.5:6, and a mixed solution was prepared. The obtained mixed solution was dried while stirring, and a sintering precursor body was obtained. The obtained sintering precursor was sintered for three hours at 900° C. The sintered obtained by the sintering was ground by a bead mill with zirconia beads ($\varphi 5$ mm) as the medium. Thus, the battery active material powder of Example 1 was obtained.

ICP composition analysis was performed for a part of the battery active material of Example 1, and the battery active material of Example 1 was found to be a titanium-containing oxide having a composition formula of $Li_2NaSr_{0.5}Ti_6O_{14}$. As for the battery active material powder of Example 1, the average particle size was 1.7 μm, specific surface area was 4.2 m$^2$/g, and pH was 10.9.

Examples 2 to 15, Comparative Examples 1 to 2

In Examples 2 to 15 and Comparative Examples 1 to 2, procedures similar to those of Example 1 were performed, except that the molar ratio of Na:Sr ratio in the mixed solution was changed to be that shown in Table 1 below, and each active material of Examples 2 to 15 and Comparative Examples 1 to 2 was synthesized.

The results of ICP composition analysis and measurement of average particle size and specific surface area for each active material powder of Examples 2 to 15, and Comparative Examples 1 to 2 are shown in Table 1 together with those of Example 1. In Table 1, information on Examples 1 to 15 and Comparative Examples 1 to 2 is shown in ascending order of value of subscript x in the general formula of $Li_2Na_{(2-x)}Sr_{(x/2)}TiO_{14}$. The pH values of the active materials of Examples 2 to 15 and Comparative Examples 1 to 2 were all within the range of 10.6 to 11.0.

TABLE 1

| | Molar ratio of Na:Sr in Mixed Solution | Composition of Active Material: $Li_2Na_{(2-x)}Sr_{(x/2)}TiO_{14}$ | | Property of Active Material | |
|---|---|---|---|---|---|
| | | x | Molar ratio of Na:Sr | Average Particle Size (μm) | Specific Surface Area (m²/g) |
| Comparative Example 1 | 2:0 | 0.00 | 2:0 | 1.7 | 4.2 |
| Example 2 | 1.9:0.05 | 0.10 | 1.9:0.05 | 1.7 | 4.2 |
| Example 3 | 1.8:0.1 | 0.20 | 1.8:0.1 | 1.8 | 4.1 |
| Example 4 | 1.75:0.125 | 0.25 | 1.75:0.125 | 1.7 | 4.2 |
| Example 5 | 1.67:0.165 | 0.33 | 1.67:0.165 | 1.6 | 4.2 |
| Example 6 | 1.6:0.2 | 0.40 | 1.6:0.2 | 1.7 | 4.2 |
| Example 7 | 1.5:0.25 | 0.50 | 1.5:0.25 | 1.6 | 4.0 |
| Example 8 | 1.37:0.335 | 0.67 | 1.37:0.335 | 1.7 | 4.1 |
| Example 1 | 1:0.5 | 1.00 | 1:0.5 | 1.7 | 4.4 |
| Example 9 | 0.67:0.665 | 1.33 | 0.67:0.665 | 1.7 | 4.3 |
| Example 10 | 0.5:0.75 | 1.50 | 0.5:0.75 | 1.8 | 4.2 |
| Example 11 | 0.4:0.8 | 1.60 | 0.4:0.8 | 1.7 | 4.2 |
| Example 12 | 0.33:0.835 | 1.67 | 0.33:0.835 | 1.6 | 4.3 |
| Example 13 | 0.25:0.875 | 1.75 | 0.25:0.875 | 1.7 | 4.4 |
| Example 14 | 0.2:0.9 | 1.80 | 0.2:0.9 | 1.6 | 4.3 |
| Example 15 | 0.1:0.95 | 1.90 | 0.1:0.95 | 1.7 | 4.5 |
| Comparative Example 2 | 0:1 | 2.00 | 0:1 | 1.7 | 4.2 |

TABLE 2

| | Molar ratio of Na:Ba In Mixed Solution | Composition of Active Material: $Li_2Na_{(2-x)}Ba_{(x/2)}TiO_{14}$ | | Property of Active Material | |
|---|---|---|---|---|---|
| | | x | Average Molar ratio of Na:Ba | Particle Size (μm) | Specific Surface Area (m²/g) |
| Comparative Example 1 | 2:0 | 0.00 | 2:0 | 1.7 | 4.2 |
| Example 22 | 1.9:0.05 | 0.10 | 1.9:0.05 | 1.9 | 4.1 |
| Example 23 | 1.8:0.1 | 0.20 | 1.8:0.1 | 2.0 | 4.2 |
| Example 24 | 1.75:0.125 | 0.25 | 1.75:0.125 | 2.0 | 4.3 |
| Example 25 | 1.67:0.165 | 0.33 | 1.67:0.165 | 2.2 | 4.4 |
| Example 26 | 1.6:0.2 | 0.40 | 1.6:0.2 | 2.2 | 4.4 |
| Example 27 | 1.5:0.25 | 0.50 | 1.5:0.25 | 1.9 | 3.9 |
| Example 28 | 1.37:0.335 | 0.67 | 1.37:0.335 | 2.0 | 4.1 |
| Example 21 | 1:0.5 | 1.00 | 1:0.5 | 2.1 | 4.0 |
| Example 29 | 0.67:0.665 | 1.33 | 0.67:0.665 | 1.9 | 3.9 |
| Example 30 | 0.5:0.75 | 1.50 | 0.5:0.75 | 1.9 | 3.9 |
| Example 31 | 0.4:0.8 | 1.60 | 0.4:0.8 | 2.0 | 4.0 |
| Example 32 | 0.33:0.835 | 1.67 | 0.33:0.835 | 2.0 | 4.2 |
| Example 33 | 0.25:0.875 | 1.75 | 0.25:0.875 | 2.1 | 4.1 |
| Example 34 | 0.2:0.9 | 1.80 | 0.2:0.9 | 1.9 | 4.2 |
| Example 35 | 0.1:0.95 | 1.90 | 0.1:0.95 | 2.0 | 4.3 |
| Comparative Example 2 | 0:1 | 2.00 | 0:1 | 2.1 | 4.0 |

Example 21

In Example 21, procedures similar to those of Example 1 were performed, except that, as a starting raw material, barium carbonate ($BaCO_3$) instead of strontium carbonate ($SrCO_3$) was used, and that starting raw materials were mixed so that molar ratio of Li:Na:Ba:Ti in the mixed solution became 2:1:0.5:6, and an active material of Example 21 was synthesized.

ICP composition analysis was performed for a part of the battery active material of Example 21, and the battery active material of Example 21 was found to be a titanium-containing oxide having a composition formula of $Li_2NaBa_{0.5}Ti_6O_{14}$. As for the battery active material powder of Example 21, its average particle size was 2.1 μm, specific surface area was 4.0 m²/g, and pH was 10.9.

Examples 22 to 35, Comparative Example 3

In Examples 22 to 35 and Comparative Example 3, procedures similar to those of Example 21 were performed, except that the molar ratio of Na/Ba in the mixed solution was changed to be that shown in Table 2 below, and each active material of Examples 22 to 35 and Comparative Example 3 was synthesized.

The results of ICP composition analysis and measurement of average particle size and specific surface area for each active material powder of Examples 21 to 35, and Comparative Example 3 are shown in Table 2, together with those of Example 21 and Comparative Example 1. In Table 2, information on Examples 21 to 35 and Comparative Examples 1 and 3 is shown in ascending order of value of subscript x in the general formula of $Li_2Na_{(2-x)}Ba_{(x/2)}TiO_{14}$. The pH value of the active materials of Examples 21 to 35 and Comparative Example 3 were all within the range of 10.6 to 11.1.

Example 41

In Example 41, procedures similar to those of Example 1 were performed, except that, as a starting raw material, niobium oxide ($Nb_2O_5$) was additively used, and that starting raw materials were mixed so that the molar ratio of Li:Na:Sr:Ti:Nb in the mixed solution became 2:1:0.5:5:1, and an active material of Example 41 was synthesized.

ICP composition analysis was performed for a part of the battery active material of Example 41, and the battery active material of Example 41 was found to be a titanium-containing oxide having a composition formula of $Li_2NaSr_{0.5}Ti_5NbO_{14}$. The battery active material of Example 41 had a pH value of 10.8.

Example 42

In Example 42, procedures similar to those of Example 1 were performed, except that, as a starting raw material, vanadium oxide ($V_2O_5$) was additively used, and that starting raw materials were mixed so that molar ratio of Li:Na:Sr:Ti:V in the mixed solution became 2:1:0.5:5:1, and an active material of Example 42 was synthesized.

ICP composition analysis was performed for a part of the battery active material of Example 42, and the battery active material of Example 42 was found to be a titanium-containing oxide having a composition formula of $Li_2NaSr_{0.5}Ti_5VO_{14}$. The battery active material of Example 42 had a pH value of 10.8.

Example 43

In Example 43, procedures similar to those of Example 1 were performed, except that, as a starting raw material, zirconium oxide ($ZrO_2$) was additively used, and that starting raw materials were mixed so that the molar ratio of Li:Na:Sr:Ti:Zr in the mixed solution became 2:1:0.5:5:1, and an active material of Example 43 was synthesized.

ICP composition analysis was performed for a part of the battery active material of Example 43, and the battery active material of Example 43 was found to be a titanium-containing oxide having a composition formula, $Li_2NaSr_{0.5}Ti_5ZrO_{14}$. The battery active material of Example 43 had a pH value of 10.9.

Example 44

In Example 44, procedures similar to those of Example 1 were performed, except that, as a starting raw material, tantalum oxide ($Ta_2O_5$) was additively used, and that starting raw materials were mixed so that the molar ratio of Li:Na:Sr:Ti:Ta in the mixed solution became 2:1:0.5:5:1, and an active material of Example 44 was synthesized.

ICP composition analysis was performed for a part of the battery active material of Example 44, and the battery active material of Example 44 was found to be a titanium-containing oxide having a composition formula of $Li_2NaSr_{0.5}Ti_5TaO_{14}$. The battery active material of Example 44 had a pH value of 10.9.

Example 45

In Example 45, procedures similar to those of Example 1 were performed, except that, as a starting raw material, molybdenum oxide ($MoO_2$) was additively used, and that starting raw materials were mixed so that molar ratio of Li:Na:Sr:Ti:Mo in the mixed solution became 2/1/0.5/5/1, and an active material of Example 45 was synthesized.

ICP composition analysis was performed for a part of the battery active material of Example 45, and the battery active material of Example 45 was found to be a titanium-containing oxide having a composition formula of $Li_2NaSr_{0.5}Ti_5MoO_4$. The battery active material of Example 45 had a pH value of 10.9.

Example 46

In Example 46, procedures similar to those of Example 1 were performed, except that, as a starting raw material, tungsten oxide ($WO_3$) was additively used, and that starting raw materials were mixed so that molar ratio of Li:Na:Sr:Ti:W ratio in the mixed solution became 2:1:0.5:5:1, and an active material of Example 46 was synthesized.

ICP composition analysis was performed for a part of the battery active material of Example 46, and the battery active material of Example 46 was found to be a titanium-containing oxide having a composition formula of $Li_2NaSr_{0.5}Ti_5WO_{14}$. The battery active material of Example 46 had a pH value was 10.8.

Example 47

In Example 47, procedures similar to those of Example 1 were performed, except that, as a starting raw material, diphosphorus pentaoxide ($P_2O_5$) was additively used, and that starting raw materials were mixed so that molar ratio of Li:Na:Sr:Ti:P in the mixed solution became 2:1:0.5:5:1, and an active material of Example 47 was synthesized.

ICP composition analysis was performed for a part of the battery active material of Example 47, and the battery active material of Example 47 was found to be a titanium-containing oxide having a composition formula of $Li_2NaSr_{0.5}Ti_5PO_{14}$. As for the battery active material of Example 47 had a pH value of 10.9.

The composition, average particle size, and specific surface area of each active material of Examples 41 to 47, together with those of Example 1, are shown in the following Table 3.

TABLE 3

| Composition of Active Material $Li_2NaSr_{0.5}Ti_{(6-y)}M2_{(z)}O_{14}$ | | | Property of Active Material | |
|---|---|---|---|---|
| | | | Average Particle Size | Specific Surface Area |
| y | z | M2 | (μm) | (m²/g) |
| Example 1 | 0 | 0 | — | 1.7 | 4.4 |
| Example 41 | 1 | 1 | Nb | 1.8 | 4.6 |
| Example 42 | 1 | 1 | V | 2.2 | 4.3 |
| Example 43 | 1 | 1 | Zr | 2.0 | 4.0 |
| Example 44 | 1 | 1 | Ta | 1.9 | 4.0 |
| Example 45 | 1 | 1 | Mo | 2.3 | 3.4 |
| Example 46 | 1 | 1 | W | 2.2 | 3.6 |
| Example 47 | 1 | 1 | P | 2.0 | 4.0 |

Examples 51 to 53

In Examples 51 to 53, active materials of Examples 51 to 53 were each synthesized as follows:

First, the powder of the active material of Example 1 was provided. To this, maltose was added, and then, they were put into a beaker together with pure water, and mixed. By utilizing a stirrer with a stirring bar, this mixture was dispersed sufficiently, and dried by evaporation. Thus, the powder of the active material of Example 1 was uniformly coated with an organic substance. Next, the coated active material was subjected to firing (carbonization by heat treatment) in an inert atmosphere with argon flow for one hour at 500° C., and the organic substance was carbonized. Thus, the active materials of Examples 51 to 53 were obtained.

In Examples 51 to 53, the carbon amount was changed under control by changing maltose adding amount.

For each active material of Examples 51 to 53, the content of carbon element was measured as described above. The contents of carbon element of Example 51, Example 52, and Example 53 were 0.3% by mass, 1% by mass, and 3% by mass, respectively.

TEM-EDX analysis was performed for a part of each of active materials of Examples 51 to 53, in order to verify carbon element exiting areas, and active materials of Examples 51 to 53 were found to have an surface layer containing carbon element formed on the surface of titanium-containing oxide particles.

Examples 61 to 63

In Examples 61 to 63, active materials of Examples 61 to 63 were each synthesized as follows:

First, the powder of the active material of Example 1 was provided, and divided into four parts. They were each fired in an ammonia gas flow (100 mL/min) for different times at 550° C. The active material fired for one hour was determined to be the active material of Example 61, that for three hours to be the active material of Example 62, that for six hours to be the active material of Example 63, and that for 12 hours to be the active material of Example 64.

For each active material of Examples 61 to 64, content of nitrogen element was measured as described above, and the contents of nitrogen element of Example 61, Example 62, Example 63, and Example 64 were 0.02% by mass, 0.25% by mass, 1.2% by mass, and 2.8% by mass, respectively.

TEM-EDX analysis was performed for a part of each of active materials of Examples 61 to 64, in order to verify nitrogen element exiting areas, and active materials of Examples 61 to 64 were found to have a surface layer containing nitrogen element formed on the surface of titanium-containing oxide particles.

<Manufacturing Beaker Cell>

By using each active material of Examples and comparative Examples, each beaker cell of Examples and Comparative Examples was manufactured as follows. Hereinafter, procedures for manufacturing the beaker cell of Example 1 by using the active material of Example 1 will be explained, however, for other Examples and Comparative Examples, each beaker cell was manufactured in the same way.

(Manufacturing Electrode)

First, 90% by mass of the active material of Example 1, 5% by mass of acetylene black as a conductive agent, and 5% by mass of polyvinylidene fluoride (PVdF) were added to N-methylpyrrolidone (NMP), and mixed to prepare a slurry. Next, both surfaces of a current collector made of aluminum foil with 12 μm of thickness were coated with this slurry, and then the coated film was dried. Then, the dried films were pressed, and an electrode having 2.2 g/cm³ of electrode density (not including the current collector) was obtained.

(Preparing Liquid Nonaqueous Electrolyte)

Ethylene carbonate (EC) and diethyl carbonate (DEC) were mixed in a volume ratio of 1:2, and a mixed solvent was obtained. To this mixed solvent, $LiPF_6$ as an electrolyte was dissolved at concentration of 1 M to prepare a liquid nonaqueous electrolyte.

(Manufacturing Beaker Cell)

By using the manufactured electrode as a working electrode, lithium metals as a counter electrode and reference electrode, a cell unit was assembled. The liquid nonaqueous electrolyte described above was poured into the cell unit, and the beaker cell of Example 1 was completed.

<Evaluating Battery Performance>

Examples 1 to 15 and Examples 21 to 35

Each beaker cell of Examples 1 to 15 and Examples 21 to 35, and Comparative Examples 1 to 3 was evaluated as follows: Hereinafter, each beaker cell of Examples and Comparative Examples is simply called a "beaker cell".

First, a beaker cell was discharged (lithium inserting) at a constant current of 0.2 C and a constant voltage of 1 V for 10 hours at 25° C., then, charged (lithium extracting) up to 3 V at a constant current of 0.2 C.

The charging curve of titanium-containing oxide (A) of $Li_2NaSr_{0.5}Ti_6O_{14}$, the charging curve of titanium-containing oxide (B) of $Li_2Na_2Ti_6O_{14}$, and the charging curve of titanium-containing oxide (C) of $Li_2SrTi_6O_{14}$ shown in FIG. 1 are the charging curve of the beaker cell of Example 1, the charging curve of the beaker cell of Comparative Example 1, and the charging curve of the beaker cell of Comparative Example 2, obtained from the 0.2 C constant-current charging explained above, respectively.

As can be seen from FIG. 1, the beaker cell of Example 1 (A) could exhibit a charging curve in which the potential continuously and gently changes over a wide SOC range without steps of potential, and could exhibit a capacity near to that of the beaker cell of Comparative Example 2 (C). Each of beaker cells of Examples 2 to 15 and Examples 21 to 35, similarly to the beaker cell of Example 1, could exhibit a charging curve in which the potential continuously and gently changes over a wide SOC range without steps of potential.

In contrast, as can be seen from FIG. 1, the beaker cell of Comparative Example 1 (B) exhibited significantly less capacity than that of the beaker cell of Example 1 (A). Moreover, the beaker cell of Comparative Example 2 (C) exhibited a charging curve with steps of potential. The beaker cell of Comparative Example 3 also exhibited, in the same way as the beaker cell of Comparative Example 2, a charging curve with steps of potential.

Next, the beaker cell was subjected to 100 cycles of charge-and-discharge. In one cycle, the beaker cells was subjected to a discharge (lithium inserting) with a constant current of 1 C and a constant voltage of 1 V for 3 hours, and then to a charge (lithium extracting) up to 3 V at a constant current of 1 C. The ratio of charging capacity at $100^{th}$ charging to the initial charging capacity was calculated as the cycle capacity retention ratio (%).

In the following Table 4 and Table 5, the average operating potential, capacity, and cycle capacity retention ratio of each beaker cell of Examples 1 to 15, Examples 21 to 35, and Comparative Examples 1 to 3 are shown.

TABLE 4

| | Subscript in General Formula of Active Material: $Li_2Na_{(2-x)}Sr_{(x/2)}TiO_{14}$ | Average Operating Potential (V vs Li/Li*) | Capacity (mAh/g) | Cycle Capacity Retention Ratio (%) |
|---|---|---|---|---|
| Comparative Example 1 | 0.00 | 1.25 | 90 | 75 |
| Example 2 | 0.10 | 1.25 | 95 | 82 |
| Example 3 | 0.20 | 1.26 | 103 | 87 |
| Example 4 | 0.25 | 1.26 | 104 | 88 |
| Example 5 | 0.33 | 1.28 | 104 | 88 |
| Example 6 | 0.40 | 1.28 | 105 | 88 |
| Example 7 | 0.50 | 1.29 | 107 | 88 |
| Example 8 | 0.67 | 1.31 | 108 | 88 |
| Example 1 | 1.00 | 1.34 | 110 | 88 |
| Example 9 | 1.33 | 1.37 | 110 | 86 |
| Example 10 | 1.50 | 1.37 | 110 | 86 |
| Example 11 | 1.60 | 1.38 | 110 | 85 |
| Example 12 | 1.67 | 1.38 | 110 | 85 |
| Example 13 | 1.75 | 1.38 | 110 | 85 |
| Example 14 | 1.80 | 1.39 | 110 | 82 |
| Example 15 | 1.90 | 1.40 | 110 | 80 |
| Comparative Example 2 | 2.00 | 1.42 | 110 | 70 |

TABLE 5

| | Subscript in General Formula of Active Material: $Li_2Na_{(2-x)}Ba_{(x/2)}TiO_{14}$ | Average Operating Potential (V vs Li/Li*) | Capacity (mAh/g) | Cycle Capacity Retention Ratio (%) |
|---|---|---|---|---|
| Comparative Example 1 | 0.00 | 1.25 | 90 | 72 |
| Example 22 | 0.10 | 1.25 | 95 | 80 |
| Example 23 | 0.20 | 1.26 | 103 | 86 |
| Example 24 | 0.25 | 1.28 | 104 | 88 |
| Example 25 | 0.33 | 1.30 | 104 | 88 |
| Example 26 | 0.40 | 1.30 | 105 | 88 |
| Example 27 | 0.50 | 1.31 | 105 | 88 |
| Example 28 | 0.67 | 1.33 | 108 | 88 |
| Example 21 | 1.00 | 1.36 | 109 | 87 |
| Example 29 | 1.33 | 1.38 | 109 | 86 |
| Example 30 | 1.50 | 1.38 | 108 | 86 |
| Example 31 | 1.60 | 1.39 | 108 | 85 |
| Example 32 | 1.67 | 1.39 | 108 | 85 |
| Example 33 | 1.75 | 1.40 | 108 | 85 |

TABLE 5-continued

| | Subscript in General Formula of Active Material: $Li_2Na_{(2-x)}Ba_{(x/2)}TiO_{14}$ | Average Operating Potential (V vs Li/Li*) | Capacity (mAh/g) | Cycle Capacity Retention Ratio (%) |
|---|---|---|---|---|
| Example 34 | 1.80 | 1.40 | 108 | 83 |
| Example 35 | 1.90 | 1.42 | 108 | 80 |
| Comparative Example 3 | 2.00 | 1.44 | 108 | 70 |

As to beaker cells of Examples 1 to 15 and Examples 21 to 35, the values of subscript x and kinds of metal M1 in a general formula of $Li_2Na_{(2-x)}M1_{(x/2)}TiO_{14}$ differ from each other. Results shown in Table 4 and Table 5 indicate that although beaker cells of Examples 1 to 15 and Examples 21 to 35 had different active material compositions, but all exhibited a more excellent capacity than that of the beaker cell of Comparative Example 1 and an excellent cycle capacity retention ratio. It is also indicated that although beaker cells of Examples 1 to 15 had different contents of Sr in the active material from each other, but all exhibited a better cycle capacity retention ratio than that of the beaker cell of Comparative Example 2. In addition, it is also indicated that although beaker cells of Examples 21 to 35 had different contents of Ba in active material, but all exhibited a better cycle capacity retention ratio than that of the beaker cell of Comparative Example 3.

Examples 41 to 47, Examples 51 to 53, and Examples 61 to 64

Beaker cells of Examples 41 to 47, Examples 51 to 53, and Examples 61 to 64 were evaluated in the same way as the beaker cell of Example 1.

Beaker cells of Examples 41 to 47, Examples 51 to 53, and Examples 61 to 64 exhibited a charging curve in which potential continuously and gently changes over a wide SOC range without steps of potential, similar to that of the beaker cell of Example 1.

For beaker cells of Examples 41 to 47, Examples 51 to 53, and Examples 61 to 64, rate characteristics evaluation was further performed as follows. For the beaker cell of Example 1, the evaluation was performed in the same way.

The beaker cells were subjected to discharge (lithium inserting) at a constant current of 1 C and constant voltage of 1 V for 3 hours, and then to charge (lithium extracting) up to 3 V at a constant current of 1 C were performed, and 1 C capacity was measured. Next, the beaker cells were subjected to discharge (lithium inserting) with a constant current of 1 C and constant voltage of 1 V for 3 hours, and then to charge (lithium extracting) up to 3 V at a constant current of 10 C, and 10 C capacity was measured. Then, the ratio of the thus measured 10 C capacity to 1 C capacity was calculated as the 10 C/1 C capacity ratio (%).

In the following Table 6, Table 7, and Table 8, the capacity and 10 C/1 C capacity ratio of each beaker cell of Examples 41 to 47, Examples 51 to 53, and Examples 61 to 64, as well as Example 1, are shown. In addition, in Table 6, the average operating potential of each beaker cell of Examples 41 to 47, as well as Example 1, is shown.

TABLE 6

| | Composition of Active Material $Li_2NaSr_{0.5}Ti_{(6-y)}M2_{(z)}O_{14}$ | | | Average Operating Potential (V vs Li/Li+) | Capacity (mAh/g) | Cycle Capacity Retention Ratio (%) |
|---|---|---|---|---|---|---|
| | y | z | M2 | | | |
| Example 1 | 0 | 0 | — | 1.34 | 110 | 84 |
| Example 41 | 1 | 1 | Nb | 1.32 | 120 | 93 |
| Example 42 | 1 | 1 | V | 1.32 | 118 | 90 |
| Example 43 | 1 | 1 | Zr | 1.33 | 116 | 90 |
| Example 44 | 1 | 1 | Ta | 1.33 | 116 | 90 |
| Example 45 | 1 | 1 | Mo | 1.34 | 114 | 88 |
| Example 46 | 1 | 1 | W | 1.34 | 114 | 88 |
| Example 47 | 1 | 1 | P | 1.35 | 110 | 86 |

TABLE 7

| | Content of Carbon (mass %) | Capacity (mAh/g) | 10 C/1 C Capacity ratio (%) |
|---|---|---|---|
| Example 1 | 0 | 110 | 84 |
| Example 51 | 0.3 | 112 | 90 |
| Example 52 | 1 | 114 | 93 |
| Example 53 | 3 | 114 | 93 |

TABLE 8

| | Content of Nitrogen (mass %) | Capacity (mAh/g) | 10 C/1 C Capacity ratio (%) |
|---|---|---|---|
| Example 1 | 0 | 110 | 84 |
| Example 61 | 0.02 | 112 | 88 |
| Example 62 | 0.25 | 114 | 90 |
| Example 63 | 1.2 | 114 | 90 |
| Example 64 | 2.8 | 110 | 86 |

The beaker cells of Examples 1 and Examples 41 to 47 whose results are shown in Table 6 are Examples whose values of subscripts y and z and whose kinds of element M2 in a general formula of $Li_2NaSr_{0.5}Ti_{(6-y)}M2_{(z)}O_{14}$ differ from each other. The results shown in Table 6 indicate that beaker cells of Examples 41 to 47 whose active material contained element M2 exhibited similar levels of average operating potential and capacity to those of Example 1, and a more excellent rate property than that of Example 1; and the rate property improving effect was large when Nb, V, Ta, or Zr was contained as element M2 (Examples 41 to 44), and was significant when Nb was contained as element M2 (Example 41).

Beaker cells of Examples 1 and Examples 51 to 53 whose results are shown in Table 7 are Examples whose contents of carbon element in active materials differed from each other. Results shown in Table 7 indicate that the beaker cells of Examples 51 to 53 including titanium-containing oxide particles coated by surface layer containing carbon element exhibited higher capacity and a more excellent rate property than those of Example 1.

Beaker cells of Examples 1 and Examples 61 to 64 whose results are shown in Table 8 are Examples whose contents of nitrogen element in active materials differed from each other. Results shown in Table 8 indicate that the beaker cells of Examples 61 to 64 including titanium-containing oxide particles which had been heat-treatment exhibited higher capacity and a more excellent rate property than those of Example 1.

From comparing results of Examples 1 to 15, Examples 21 to 35, Examples 41 to 47, Examples 51 to 53, and Examples 61 to 64, with results of Comparative Examples 1 to 3, explained above, it was found that each active material of Examples 1 to 15, Examples 21 to 35, Examples 41 to 47, Examples 51 to 53, and Examples 61 to 64 can realize a beaker cell which can exhibit excellent input-output characteristics, excellent life property, and a operating potential lower than 1.55 V (vs. Li/Li$^+$). It was also found that since the active material of each of Examples can realize such a low operating potential, a nonaqueous electrolyte battery including a negative electrode containing active material of each of Examples as a negative electrode active material can exhibit a high voltage.

<Manufacturing Nonaqueous Electrolyte Battery>

Example 71

In Example 71, the nonaqueous electrolyte battery of Example 71 was manufactured as follows:

By using the active material of Example 1 as the negative electrode active material, a negative electrode was produced.

By using a lithium-manganese composite oxide having a spinel-type crystal structure ($Li_{1.1}Mn_{1.9}Al_{0.1}O_4$) as the positive electrode active material, a positive electrode was produced.

A mixed solvent was prepared by mixing propylene carbonate (PC) and γ-butyrolactone (GBL) in a volume ratio of 1:2. $LiBF_4$ was dissolved in the mixed solvent at the concentration of 1.5 M. Thus, a nonaqueous electrolyte was prepared.

By using the thus obtained negative electrode, positive electrode, and nonaqueous electrolyte, and a laminate film as a container member, a battery of Example 71 having dimensions of thickness 4 mm×width 72 mm×height 100 mm, and a capacity of 2 Ah was manufactured. The voltage of the battery of Example 71 was 2.7 V. That is, it was verified that the battery of Example 71 can constitute, by a five-series connection, a system that can exhibit a compatibility with a lead acid storage battery.

Example 72

In Example 72, the nonaqueous electrolyte battery of Example 72 was manufactured as follows:

A negative electrode was prepared in the same way as Example 71. A positive electrode was prepared in the same way as Example 71, except that a lithium-nickel-manganese-cobalt composite oxide having a spinel-type crystal structure ($LiNi_{0.6}Mn_{0.2}Co_{0.2}O_2$) was used as the positive electrode active material. A nonaqueous electrolyte was prepared in the same way as Example 71.

By using the thus obtained negative electrode, positive electrode, and nonaqueous electrolyte, and a laminate film as a container member, a battery of Example 72 having a dimensions of thickness 3.4 mm×width 72 mm×height 100 mm, and a capacity of 2 Ah was manufactured. The voltage of the battery of Example 72 was 2.5 V. That is, it was verified that the battery of Example 72 can constitute, by a five-series connection, a system that can exhibit a compatibility with a lead acid storage battery.

Example 73

In Example 73, the nonaqueous electrolyte battery of Example 73 was manufactured as follows:

A negative electrode was prepared in the same way as Example 71. A positive electrode was prepared in the same way as Example 71, except that lithium iron phosphate ($LiFePO_4$) having an olivine-type crystal structure was used as the positive electrode active material. A nonaqueous electrolyte was prepared in the same way as Example 71.

By using thus obtained negative electrode, positive electrode, and nonaqueous electrolyte, and a laminate film as a container member, a battery of Example 73 having a dimension of thickness 3.6 mm×width 72 mm×height 100 mm, and a capacity of 2 Ah was manufactured. The voltage of the battery of Example 73 was 2.1 V. That is, it was verified that the battery of Example 73 can constitute, by a six-series connection, a system that can exhibit a compatibility with a lead acid storage battery.

Comparative Example 71

In Comparative Example 71, the nonaqueous electrolyte battery of Comparative Example 71 was manufactured as follows:

A negative electrode was prepared in the same way as Example 71, except that graphite was used as the negative electrode active material. A positive electrode was prepared in the same way as Example 73. A nonaqueous electrolyte was prepared in the same way as Example 71.

By using the thus obtained negative electrode, positive electrode, and nonaqueous electrolyte, and a laminate film as a container member, a battery of Comparative Example 71 having dimensions of thickness 3.6 mm×width 72 mm×height 100 mm, and a capacity of 2 Ah was manufactured. The voltage of the battery of Comparative Example 71 was 3.4 V.

<Evaluation>

The batteries of Examples 71 to 73, and Comparative Example 71 were subjected to charge-and-discharge cycle test at 80° C. In one cycle, charge at 1 C and discharge at 1 C were performed. Cycle capacity retention ratios (%) after 500 cycles were measured. The results are shown in the following Table 9.

TABLE 9

| | Cycle Capacity Retention Ratio (%) |
|---|---|
| Example 71 | 80 |
| Example 72 | 92 |
| Example 73 | 96 |
| Comparative Example 71 | >5 |

The results shown in Table 9 indicate that batteries of Examples 71 to 73 using the active material of Example 1 for negative electrode can exhibit significantly better capacity retention ratio than that of the battery of Comparative Example 71, and can have excellent high-temperature durability. Especially, the nonaqueous electrolyte battery of Example 73 where lithium iron phosphate ($LiFePO_4$) was used as the positive electrode active material, and 1.5 M LiBF$_4$—PC/GBL (1:2) electrolyte was used could exhibit an extremely preferable cycle capacity retention ratio. In contrast, in the nonaqueous electrolyte battery of Comparative Example 71 where graphite was used as the negative electrode active material, although lithium iron phosphate (LiFePO$_4$) was used as the positive electrode active material, its capacity significantly reduced after approximately 10 cycles, and reduced to almost zero after 500 cycles.

The above explained battery active material according to at least one Embodiment or Example includes a titanium-containing oxide represented by the general formula of Li$_{(2+w)}$Na$_{(2-x)}$M1$_{(x/2)}$Ti$_{(6-y)}$M2$_z$O$_{14}$. M1 is at least one metallic element selected from the group consisting of Sr, Ba and Pb, M2 is at least one element selected from the group consisting of metallic elements M (excluding Ti and M1) and P. This active material can exhibit stable input and output over a wide SOC range together with large capacity, can exhibit an excellent cycle life, and in the active material, the inserting and extracting reactions of lithium can progress at a lower potential than that of lithium titanate. Thus, this active material can realize a nonaqueous electrolyte battery that can show excellent input-output characteristics and high voltage.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An active material comprising titanium-containing oxide represented by a general formula of Li$_{(2+w)}$Na$_{(2-x)}$M1$_{(x/2)}$Ti$_{(6-y)}$M2$_z$O$_{14}$, wherein
   in the general formula,
   the subscripts w, x, y and z are within ranges of 0≤w≤6, 0<x<2, 0≤y≤3, and 0≤z≤3, respectively;
   M1 is at least one metallic element selected from the group consisting of Sr, Ba, and Pb; and
   M2 is at least one element selected from the group consisting of Zr, V, Nb, Ta, Mo, W, and P.

2. The active material according to claim 1, wherein the subscript x is within a range of 0.1≤x≤1.9.

3. The active material according to claim 1, wherein the subscript y is within a range of 0.01≤y≤3, and the subscript z is within a range of 0.01≤z≤3.

4. The active material according to claim 1 comprising:
   a particle of the titanium-containing oxide; and
   a surface layer formed on at least a part of surface of the particle and comprising at least one element of carbon and nitrogen.

5. The active material according to claim 4, wherein the surface layer comprises carbon element, and the content of the carbon element in the active material is from 0.01% by mass to 10% by mass, based on mass of the active material.

6. The active material according to claim 4, wherein the surface layer comprises nitrogen element, and the content of the nitrogen element in the active material is from 0.01% by mass to 3% by mass, based on mass of the active material.

7. A nonaqueous electrolyte battery comprising:
   a positive electrode;
   a negative electrode comprising the active material according to claim 1; and
   a nonaqueous electrolyte.

8. The nonaqueous electrolyte battery according to claim 7, wherein the positive electrode comprises a positive electrode active material comprising an iron-containing phosphate having an olivine-type crystal structure.

9. A battery module comprising 6m nonaqueous electrolyte batteries, each according to claim 8, wherein m is an integer being not smaller than 1, and the 6m nonaqueous electrolyte batteries are connected in series.

10. The nonaqueous electrolyte battery according to claim 7, wherein the positive electrode comprises a positive electrode active material comprising a lithium-manganese composite oxide having a spinel-type crystal structure.

11. A battery module comprising 5n nonaqueous electrolyte batteries, each according to claim 10, wherein n is an integer being not smaller than 1 and the 5n nonaqueous electrolyte batteries are connected in series.

12. A battery pack comprising the nonaqueous electrolyte battery according to claim 7.

13. An automobile comprising the battery pack according to claim 12, wherein the battery pack is placed in the engine room.

14. A vehicle comprising the battery pack according to claim 12.

* * * * *